(12) United States Patent
    Fields et al.

(10) Patent No.: US 9,934,667 B1
(45) Date of Patent: *Apr. 3, 2018

(54) VEHICLE OPERATOR EMOTION MANAGEMENT SYSTEM AND METHOD

(71) Applicant: STATE FARM MUTUAL AUTOMOBILE INSURANCE COMPANY, Bloomington, IL (US)

(72) Inventors: Brian Mark Fields, Normal, IL (US); Samuel C. Weeks, Mundelein, IL (US); Thasphon Chuenchujit, Urbana, IL (US); Kelsey Catherine Yoshie Stiles, St. Louis, MO (US); Allison Lynne Diaz, Bloomington, IL (US); Alisha Deshmukh, Campbell, CA (US); Mihir D. Angal, San Jose, CA (US); Akash Duseja, New Delhi (IN); Aaron Scott Chan, Champaign, IL (US); Matthew Christopher Jon Donovan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,125

(22) Filed: May 19, 2017

Related U.S. Application Data

(63) Continuation of application No. 14/201,491, filed on Mar. 7, 2014.

(51) Int. Cl.
    *G06Q 40/00* (2012.01)
    *G08B 21/02* (2006.01)
    (Continued)

(52) U.S. Cl.
    CPC ......... *G08B 21/02* (2013.01); *G06Q 30/0283* (2013.01); *G06Q 40/08* (2013.01)

(58) Field of Classification Search
    USPC ....... 705/35, 2, 3, 4, 5, 38, 39, 37; 303/191; 382/104, 117; 340/576, 435, 439;
    (Continued)

(56) References Cited

U.S. PATENT DOCUMENTS

| 4,218,763 A | 8/1980 | Kelley et al. |
| 4,565,997 A | 1/1986 | Seko et al. |

(Continued)

OTHER PUBLICATIONS

Bondarev, Design of an Emotion Management System for a Home Reboot, Koninklijke Philips Electronics NV, 63 pp. (2002).
(Continued)

*Primary Examiner* — Tien C Nguyen
(74) *Attorney, Agent, or Firm* — Marshall, Gerstein & Borun LLP

(57) ABSTRACT

The method, system, and computer-readable medium facilitates monitoring a vehicle operator during the course of vehicle operation to determine whether the vehicle operator is in an emotionally impaired state (e.g., aggressive or agitated) and presenting appropriate stimuli (e.g., music or sound recordings) to the vehicle operator when impairment is detected. The vehicle operator, the environment surrounding the vehicle, or forces acting on the vehicle may be monitored using a variety of sensors, including optical sensors, accelerometers, or biometric sensors (e.g., skin conductivity, heart rate, or voice modulation). When the vehicle operator is determined to be in an emotionally impaired state, stimuli are selected to improve the emotional state of the vehicle operator. The selection is based on sensor data and data regarding prior responses of the vehicle operator to various stimuli. After selection, the stimuli are
(Continued)

presented to the vehicle operator while monitoring continues.

20 Claims, 11 Drawing Sheets

(51) Int. Cl.
  *G06Q 30/02* (2012.01)
  *G06Q 40/08* (2012.01)

(58) Field of Classification Search
  USPC .................. 345/173; 219/204; 348/143, 158;
      434/236; 701/1; 702/32; 709/203, 232;
      700/300; 600/301, 509, 545, 26;
      707/758
  See application file for complete search history.

(56) References Cited

U.S. PATENT DOCUMENTS

| | | | |
|---|---|---|---|
| 5,368,484 A | 11/1994 | Copperman et al. | |
| 5,488,353 A | 1/1996 | Kawakami et al. | |
| 5,499,182 A | 3/1996 | Ousborne | |
| 5,515,026 A | 5/1996 | Ewert | |
| 5,574,641 A | 11/1996 | Kawakami et al. | |
| 5,626,362 A | 5/1997 | Mottola | |
| 5,689,241 A * | 11/1997 | Clarke, Sr. ............... | A61B 5/18 340/575 |
| 5,835,008 A | 11/1998 | Colemere, Jr. | |
| 6,031,354 A | 2/2000 | Wiley et al. | |
| 6,253,129 B1 | 6/2001 | Jenkins et al. | |
| 6,313,749 B1 * | 11/2001 | Horne ..................... | G08B 21/06 340/575 |
| 6,353,396 B1 * | 3/2002 | Atlas ...................... | G08B 21/06 340/575 |
| 6,473,000 B1 | 10/2002 | Secreet et al. | |
| 6,477,117 B1 | 11/2002 | Narayanaswami et al. | |
| 6,556,905 B1 | 4/2003 | Mittelsteadt et al. | |
| 6,579,233 B2 * | 6/2003 | Hursh .................. | A61B 5/4809 128/920 |
| 6,661,345 B1 * | 12/2003 | Bevan .................. | G08B 21/06 340/575 |
| 6,704,434 B1 | 3/2004 | Sakoh et al. | |
| 6,909,947 B2 | 6/2005 | Douros et al. | |
| 7,027,621 B1 | 4/2006 | Prokoski | |
| 7,054,723 B2 | 5/2006 | Seto et al. | |
| 7,138,922 B2 * | 11/2006 | Strumolo ............... | G08B 21/06 340/539.18 |
| 7,149,533 B2 | 12/2006 | Laird et al. | |
| 7,253,724 B2 | 8/2007 | Prakah-Asante et al. | |
| 7,302,344 B2 | 11/2007 | Olney et al. | |
| 7,356,392 B2 | 4/2008 | Hubbard et al. | |
| 7,423,540 B2 * | 9/2008 | Kisacanin ............. | G06K 9/00362 340/576 |
| 7,424,414 B2 | 9/2008 | Craft | |
| 7,609,150 B2 | 10/2009 | Wheatley et al. | |
| 7,639,148 B2 | 12/2009 | Victor | |
| 7,692,552 B2 | 4/2010 | Harrington et al. | |
| 7,719,431 B2 * | 5/2010 | Bolourchi ............ | B60K 28/066 340/439 |
| 7,792,328 B2 * | 9/2010 | Albertson ............ | B60W 40/09 340/576 |
| 7,835,834 B2 | 11/2010 | Smith et al. | |
| 8,009,051 B2 | 8/2011 | Omi | |
| 8,010,283 B2 | 8/2011 | Yoshida et al. | |
| 8,016,595 B2 | 9/2011 | Aoki et al. | |
| 8,040,247 B2 * | 10/2011 | Gunaratne ............. | A61B 5/18 340/5.83 |
| 8,078,334 B2 * | 12/2011 | Goodrich ........... | A61B 5/14546 119/771 |
| 8,123,686 B2 * | 2/2012 | Fennell ................ | A61B 5/0002 370/314 |
| 8,185,380 B2 | 5/2012 | Kameyama | |
| 8,437,966 B2 * | 5/2013 | Connolly ............. | A61B 5/0002 702/32 |
| 8,554,468 B1 | 10/2013 | Bullock | |
| 8,595,034 B2 | 11/2013 | Bauer et al. | |
| 8,738,523 B1 | 5/2014 | Sanchez et al. | |
| 8,876,535 B2 | 11/2014 | Fields et al. | |
| 8,902,054 B2 * | 12/2014 | Morris ............. | H04M 1/72577 340/439 |
| 8,917,182 B2 * | 12/2014 | Chang ................... | G08B 21/06 116/101 |
| 8,981,942 B2 | 3/2015 | He et al. | |
| 9,135,803 B1 | 9/2015 | Fields et al. | |
| 9,205,842 B1 | 12/2015 | Fields et al. | |
| 9,229,905 B1 | 1/2016 | Penilla et al. | |
| 9,275,552 B1 | 3/2016 | Fields et al. | |
| 9,283,847 B2 | 3/2016 | Riley, Sr. et al. | |
| 9,342,993 B1 | 5/2016 | Fields et al. | |
| 9,440,657 B1 | 9/2016 | Fields et al. | |
| 9,478,150 B1 | 10/2016 | Fields et al. | |
| 9,530,333 B1 | 12/2016 | Fields et al. | |
| 9,734,685 B2 | 8/2017 | Fields et al. | |
| 2002/0128751 A1 * | 9/2002 | Engstrom ............ | G05B 13/027 701/1 |
| 2002/0146667 A1 | 10/2002 | Dowdell et al. | |
| 2004/0005927 A1 | 1/2004 | Bonilla et al. | |
| 2004/0017106 A1 * | 1/2004 | Aizawa .................... | B60T 7/12 303/191 |
| 2004/0054452 A1 | 3/2004 | Bjorkman | |
| 2004/0077285 A1 | 4/2004 | Bonilla et al. | |
| 2004/0090334 A1 | 5/2004 | Zhang et al. | |
| 2004/0158476 A1 | 8/2004 | Blessinger et al. | |
| 2004/0252027 A1 * | 12/2004 | Torkkola ............. | G08B 21/06 340/576 |
| 2005/0108910 A1 | 5/2005 | Esparza et al. | |
| 2005/0131597 A1 | 6/2005 | Raz et al. | |
| 2005/0154513 A1 * | 7/2005 | Matsunaga ........... | B60T 8/1725 701/38 |
| 2005/0216136 A1 * | 9/2005 | Lengning ............. | B60W 40/09 701/1 |
| 2006/0052909 A1 | 3/2006 | Cherouny | |
| 2006/0053038 A1 * | 3/2006 | Warren .................. | G06Q 40/08 705/4 |
| 2006/0232430 A1 | 10/2006 | Takaoka et al. | |
| 2007/0001831 A1 | 1/2007 | Raz et al. | |
| 2007/0048707 A1 * | 3/2007 | Caamano ............. | A61B 5/0002 434/236 |
| 2007/0080816 A1 * | 4/2007 | Haque ................ | B60K 28/066 340/576 |
| 2007/0122771 A1 | 5/2007 | Maeda et al. | |
| 2007/0159344 A1 | 7/2007 | Kisacanin | |
| 2008/0064014 A1 | 3/2008 | Wojtczak et al. | |
| 2008/0082372 A1 | 4/2008 | Burch | |
| 2008/0204256 A1 | 8/2008 | Omi | |
| 2008/0291008 A1 | 11/2008 | Jeon | |
| 2008/0300733 A1 * | 12/2008 | Rasshofer ............. | G01S 13/42 701/1 |
| 2009/0063030 A1 | 3/2009 | Howarter et al. | |
| 2010/0005649 A1 | 1/2010 | Kim et al. | |
| 2010/0055649 A1 | 3/2010 | Takahashi et al. | |
| 2010/0131304 A1 * | 5/2010 | Collopy ............ | G06Q 30/0224 705/4 |
| 2010/0214087 A1 | 8/2010 | Nakagoshi et al. | |
| 2011/0043350 A1 * | 2/2011 | Ben David ............ | B60Q 9/00 340/441 |
| 2011/0090075 A1 | 4/2011 | Armitage et al. | |
| 2011/0106370 A1 | 5/2011 | Duddle et al. | |
| 2011/0109462 A1 * | 5/2011 | Deng .................... | G08B 21/06 340/575 |
| 2011/0304465 A1 | 12/2011 | Boult et al. | |
| 2011/0307188 A1 | 12/2011 | Peng et al. | |
| 2012/0025969 A1 | 2/2012 | Dozza | |
| 2012/0053824 A1 * | 3/2012 | Nam ..................... | G01F 9/001 701/123 |
| 2012/0083668 A1 | 4/2012 | Pradeep et al. | |
| 2012/0083974 A1 | 4/2012 | Sandblom | |
| 2012/0108909 A1 | 5/2012 | Slobounov et al. | |
| 2012/0116548 A1 | 5/2012 | Goree et al. | |

(56) References Cited

U.S. PATENT DOCUMENTS

| | | | |
|---|---|---|---|
| 2012/0143391 A1* | 6/2012 | Gee | G06F 3/01 701/1 |
| 2012/0190001 A1 | 7/2012 | Knight et al. | |
| 2012/0191343 A1 | 7/2012 | Haleem | |
| 2012/0215375 A1 | 8/2012 | Chang | |
| 2012/0316406 A1 | 12/2012 | Rahman et al. | |
| 2013/0006674 A1 | 1/2013 | Bowne et al. | |
| 2013/0006675 A1 | 1/2013 | Bowne et al. | |
| 2013/0038437 A1 | 2/2013 | Talati et al. | |
| 2013/0057671 A1 | 3/2013 | Levin et al. | |
| 2013/0073115 A1 | 3/2013 | Levin et al. | |
| 2013/0144459 A1 | 6/2013 | Ricci | |
| 2013/0164715 A1 | 6/2013 | Hunt et al. | |
| 2013/0189649 A1 | 7/2013 | Mannino | |
| 2013/0209968 A1 | 8/2013 | Miller et al. | |
| 2013/0227409 A1 | 8/2013 | Das et al. | |
| 2013/0307786 A1* | 11/2013 | Heubel | G06F 3/016 345/173 |
| 2014/0047347 A1 | 2/2014 | Mohn et al. | |
| 2014/0059066 A1* | 2/2014 | Koloskov | G06F 17/30017 707/758 |
| 2014/0099607 A1 | 4/2014 | Armitage et al. | |
| 2014/0108198 A1 | 4/2014 | Jariyasunant et al. | |
| 2014/0125474 A1 | 5/2014 | Gunaratne | |
| 2014/0167967 A1 | 6/2014 | He et al. | |
| 2014/0168399 A1 | 6/2014 | Plummer et al. | |
| 2014/0172467 A1 | 6/2014 | He et al. | |
| 2014/0218187 A1* | 8/2014 | Chun | G08B 21/06 340/439 |
| 2014/0240132 A1 | 8/2014 | Bychkov | |
| 2014/0309864 A1 | 10/2014 | Ricci | |
| 2015/0051752 A1 | 2/2015 | Paszkowicz | |
| 2015/0070265 A1 | 3/2015 | Cruz-Hernandez et al. | |
| 2015/0302719 A1 | 10/2015 | Mroszczak et al. | |

OTHER PUBLICATIONS

Chan et al., The emotional side of cognitive distraction: implications for road safety, Accident Analysis and Prevention, 50:147-54 (2013).
Grifantini, Sensor detects emotions through the skin, MIT Technology Review (Oct. 26, 2010).
Hancock et al., "The Impact of Emotions and Predominant Emotion Regulation Technique on Driving Performance", pp. 5882-5885, 2012.
Laine et al., Behavioral triggers of skin conductance responses and their neural correlates in the primate amygdala, J. Neurophysiol., 101:1749-54 (2009).
Lee et al., What is stressful on the road? Analysis on aggression-inducing traffic situations through self-report, Proceedings of the Human Factors and Ergonomics Society Annual Meeting, 57(1):1500-1503 (Sep. 2013).
Lomas, Can an algorithm be empathetic? UK startup El technologies is building software that's sensitive to tone of voice, downloaded from the Internet at: https://techcrunch.com/2013/08/04/empathy/ (Aug. 4, 2013).
McCraty et al., "The Effects of Different Types of Music on Mood, Tension, and Mental Clarity." Alternative Therapies in Health and Medicine 4.1 (1998): 75-84. NCBI PubMed. Web. Jul. 11, 2013.
Nasoz et al., Emotion recognition from physiological signals using wireless sensors for presence technologies, Cogn. Tech. Work, 6:4-14 (2004).
Nass et al., Improving automotive safety by pairing driver emotion and car voice emotion. CHI 2005 Late Breaking Results: Short Papers, Portland, Oregon (Apr. 2-7 2005).
U.S. Appl. No. 13/844,090, Fields et al., filed Mar. 15, 2013.
U.S. Appl. No. 13/844,090, Nonfinal Office Action, dated Dec. 4, 2013.
U.S. Appl. No. 13/844,090, Notice of Allowance, dated Jul. 8, 2014.
U.S. Appl. No. 14/201,491, Fields et al., filed Mar. 7, 2014.
U.S. Appl. No. 14/201,491, Final Office Action, dated Jan. 16, 2015.
U.S. Appl. No. 14/201,491, Final Office Action, dated Sep. 11, 2015.
U.S. Appl. No. 14/201,491, Nonfinal Office Action, dated Apr. 29, 2015.
U.S. Appl. No. 14/201,491, Nonfinal Office Action, dated Sep. 26, 2014.
U.S. Appl. No. 14/201,491, Nonfinal Office Action, dated Sep. 26, 2016.
U.S. Appl. No. 14/201,491, Notice of Allowance, dated Apr. 21, 2017.
U.S. Appl. No. 14/255,934, Fields et al., filed Apr. 17, 2014.
U.S. Appl. No. 14/255,934, Final Office Action, dated Sep. 23, 2014.
U.S. Appl. No. 14/255,934, Nonfinal Office Action, dated Jan. 15, 2015.
U.S. Appl. No. 14/255,934, Nonfinal Office Action, dated Jun. 18, 2014.
U.S. Appl. No. 14/255,934, Notice of Allowance, dated Apr. 28, 2015.
U.S. Appl. No. 14/269,490, Advisory Action, dated Apr. 1, 2015.
U.S. Appl. No. 14/269,490, Final Office Action, dated Jan. 23, 2015.
U.S. Appl. No. 14/269,490, Nonfinal Office Action, dated Jun. 11, 2015.
U.S. Appl. No. 14/269,490, Nonfinal Office Action, dated Sep. 12, 2014.
U.S. Appl. No. 14/269,490, Notice of Allowance, dated Nov. 17, 2015.
U.S. Appl. No. 14/469,490, Riley et al., filed May 5, 2014.
U.S. Appl. No. 14/511,712, Fields et al., filed Oct. 10, 2014.
U.S. Appl. No. 14/511,712, Final Office Action, dated Jun. 25, 2015.
U.S. Appl. No. 14/511,712, Notice of Allowance, dated Oct. 22, 2015.
U.S. Appl. No. 14/511,712, Office Action, dated for Dec. 26, 2014.
U.S. Appl. No. 14/511,750, Fields et al., filed Oct. 10, 2014.
U.S. Appl. No. 14/511,750, Office Action, dated Dec. 19, 2014.
U.S. Appl. No. 14/729,290, Fields et al., filed Jun. 3, 2015.
U.S. Appl. No. 14/729,290, Notice of Allowance, dated Aug. 5, 2015.
U.S. Appl. No. 14/857,242, Fields et al., filed Sep. 17, 2015.
U.S. Appl. No. 14/857,242, Final Office Action, dated Apr. 20, 2016.
U.S. Appl. No. 14/857,242, Nonfinal Office Action, dated Jan. 22, 2016.
U.S. Appl. No. 14/857,242, Notice of Allowance, dated Jul. 1, 2016.
U.S. Appl. No. 15/005,300, Nonfinal Office Action, dated Oct. 5, 2017.
U.S. Appl. No. 15/005,300, Riley et al., filed Jan. 25, 2016.
U.S. Appl. No. 15/005,498, Fields et al., filed Jan. 25, 2016.
U.S. Appl. No. 15/005,498, Nonfinal Office Action, dated Mar. 31, 2016.
U.S. Appl. No. 15/005,498, Notice of Allowance, dated Aug. 2, 2016.
U.S. Appl. No. 15/076,142, Fields et al., filed Mar. 21, 2016.
U.S. Appl. No. 15/076,142, Nonfinal Office Action dated Aug. 9, 2016.
U.S. Appl. No. 15/076,142, Notice of Allowance, dated Sep. 19, 2016.
U.S. Appl. No. 15/229,926, Fields et al., filed Aug. 5, 2016.
U.S. Appl. No. 15/229,926, Notice of Allowance, dated Aug. 15, 2017.
U.S. Appl. No. 15/255,538, Fields et al., filed Sep. 2, 2016.
U.S. Appl. No. 15/285,001, Fields et al., filed Oct. 4, 2016.
U.S. Appl. No. 15/511,750, Final Office Action, dated Jun. 30, 2015.
U.S. Appl. No. 15/511,750, Nonfinal Office Action, dated Nov. 3, 2015.
U.S. Appl. No. 15/511,750, Notice of Allowance, dated Mar. 4, 2016.
Wiesenthal et al., "The Influence of Music on Driver Stress", Journal of Applied Social Psychology 30, 8, pp. 1709-1719, 2000.
"Biofeedback mobile app", Kurzweill Accelerating Intelligence, downloaded from the Internet at: ,http://www.kurzweilai.net/biofeedback-mobile-app> (Feb. 12, 2013).
"Intel Capital to Invest in Future of Automotive Technology", News Release, Intel Corp. (Feb. 29, 2012).

(56) References Cited

OTHER PUBLICATIONS

"MIT Spin-off Affective Raises $5.7 Million to Commercialize Emotion Technology", Business Wire (Jul. 19, 2011).
Bosker, Affectiva's Emotion Recognition Tech: When Machines Know What You're Feeling, www.HuffPost.com (Dec. 24, 2012).
Cutler, Using the IPhone's Front-Facing Camera, Cardiio Measures Your Heartrate, downloaded from the Internet at: <https://techcrunch.com/2012/08/09/cardiio/> (Aug. 9, 2012).
Goldmark, MIT is making a road frustration index to measure stresses of driving, Fast Company (Jul. 23, 2013).
Graham-Rowe, "A Smart Phone that Knows You're Angry", MIT Technology Review (Jan. 9, 2012).
Healy, Detecting Stress during Real-world Driving Tasks Using Physiological Sensors, IEEE Trans Intelligent Transportation Systems 6.2:156-66 (2005).
Mood Affective Apps, National Center for Telehealth & Technology, downloaded from the Internet at: <http://t2health.dcoe.mil/> (Date??).
Murph, Affectiva's Q Sensor Wristband Monitors and Logs Stress Levels, Might Bring Back the Snap Bracelet, Engadget.com (Nov. 2, 2010).
Philipson, Want to drive safely? Listen to Elton John, Aerosmith or S Club 7, The Telegraph (Jan. 8, 2013).
Shaya, "For Some, Driving Is More Stressful than Skydiving." AutomotiveNews.com. Automotive News, Jun. 12, 2013.
Sorrel, App Measures Vital Signs Using IPad Camera, wired.com (Nov. 18, 2011).
Talbot, "Wrist Sensor Tells You How Stressed Out You Are", MIT Technology Review (Dec. 20, 2012).
Toor, Valve looks to sweat levels and eye controls for future game design, downloaded from the Internet at: https://www.theverge.com/2013/5/7/4307750/valve-biometric-eye-tracking-sweat-left-4-dead-portal-2 (May 7, 2013).

\* cited by examiner

VEHICLE OPERATOR EMOTION MANAGEMENT SYSTEM AND METHOD

CROSS-REFERENCE TO RELATED APPLICATIONS

This application is a continuation of U.S. patent application Ser. No. 14/201,491, filed on Mar. 7, 2014, the entirety of which is incorporated herein by reference.

TECHNICAL FIELD

The present disclosure generally relates to a system and a method for managing vehicle operator emotions by determining when a vehicle operator is in an impaired emotional state and providing targeted stimuli to moderate the emotional state.

BACKGROUND

Every year many vehicle accidents are caused by impaired vehicle operation. One common kind of impaired vehicle operation is agitated, anxious, or aggressive driving. Numerous incidents occurring during the course of a trip may aggravate the vehicle operator, such as traffic jams, poor driving by other drivers, vehicle malfunctions, or inclement weather conditions. Additionally, factors unrelated to the trip may aggravate the vehicle operator, such as receipt of bad news, running behind schedule, passenger conduct, or any number of factors occurring prior to vehicle operation. These and other stressors may contribute to emotional responses of vehicle operators that impair their ability to operate vehicles safely.

Many modern vehicles are equipped with a variety of devices that may also have an impact on a vehicle operator's emotional state, such as sound systems. Music is known to influence the emotional state of listeners, and the effect is known to depend upon the music presented, as well as the musical tastes and preferences of the listener. A variety of systems and methods are available to learn listener preferences and predict whether a listener will generally enjoy a particular piece of music.

SUMMARY

The present invention discloses a method, system, and computer-readable medium storing instructions for managing the emotional state of a vehicle operator. One embodiment consists of a computer-implemented method including receiving data about a vehicle operator and vehicle operation from one or more sensors, processing the sensor data to determine whether the vehicle operator is in an impaired emotional state, selecting one or more appropriate stimuli (e.g., music, sound recordings, or tones) based on the sensor data and information regarding the vehicle operator when the vehicle operator is determined to be in an emotionally impaired state, and presenting the stimuli to the vehicle operator. An alternative embodiment consists of a computer system including one or more processors, sensors, and program memories storing instructions that when executed by the one or more processors cause the computer system to receive data about a vehicle operator and vehicle operation from the sensors, process the sensor data to determine whether the vehicle operator is in an impaired emotional state, select one or more appropriate stimuli based on the sensor data and information regarding the vehicle operator when the vehicle operator is determined to be in an emotionally impaired state, and present the stimuli to the vehicle operator. Another alternative embodiment consists of a tangible, non-transitory computer-readable medium storing instructions that when executed by one or more processors of a computer system cause the computer system to receive data about a vehicle operator and vehicle operation from the sensors, process the sensor data to determine whether the vehicle operator is in an impaired emotional state, select one or more appropriate stimuli based on the sensor data and information regarding the vehicle operator when the vehicle operator is determined to be in an emotionally impaired state, and present the stimuli to the vehicle operator.

The sensors may include any electronic device capable of providing sensor data regarding the vehicle operator, vehicle motion, or the vehicle's environment. In addition to other information, the sensors may be used to monitor the following physiological data regarding the vehicle operator: heart rate, heart rate variability data, grip pressure, electrodermal activity data, telematics driving score, body temperature, arm movement, head movement, vocal amplitude, vocal frequency, vocal pattern, gaze direction, gaze duration, head direction, eyelid opening, blink rate, pupillometry data, blood pressure, electroencephalographic data, respiration rate, respiration pattern, galvanic skin response, functional near infrared optical brain imaging data, functional magnetic resonance imaging data, and electromyographic data. The sensors may also be used to monitor the following non-physiological data: vehicle lane deviation, vehicle swerving, vehicle lane centering, vehicle acceleration along a single axis or multiple axes, and vehicle distance to other objects. Additional sensor data from sensors currently existing or later developed may also be used.

In some embodiments, the sensors may be communicatively connected to a mobile device, such as a smart phone, or an on-board computer. The mobile device or on-board computer may receive sensor data, process the sensor data to determine whether a vehicle operator is in an emotionally impaired state, access a user profile for the vehicle operator, select appropriate stimuli based on the sensor data and user profile, and present the selected stimuli to the vehicle operator. The determination of whether the vehicle operator is in an impaired emotional state may involve calculating impairment scores (e.g., a pulse rate score, a pupil dilation score, a hard braking score, etc.) using the sensor data, then calculating one or more total impairment scores (e.g., a total aggression score, a total anxiety score, etc.) from the impairment scores. The vehicle operator may be determined to be in an emotionally impaired state when any of the total scores fall below a minimum threshold value or exceed a maximum threshold value. Additionally, the mobile device or on-board computer may communicate with one or more servers, which may perform part or all of the aforementioned functions. In some embodiments, the total impairment scores may be used to adjust an insurance premium charged to the vehicle operator.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in FIG. 1 illustrates a block diagram of a computer network, a computer server, a mobile device, and an on-board computer on which an exemplary vehicle operator emotion management system and method may operate in accordance with the described embodiments.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

As used herein, the term "impaired emotional state" refers to any of a number of psychological states such as anxiety, agitation, aggression, nervousness, hyperactivity, mania, distraction, lethargy, or drowsiness that may reduce vehicle operator performance. Additionally, as used herein, the term "vehicle" may refer to any of a number of motorized transportation devices. A vehicle may be a car, truck, bus, train, boat, plane, etc.

Figure 1:
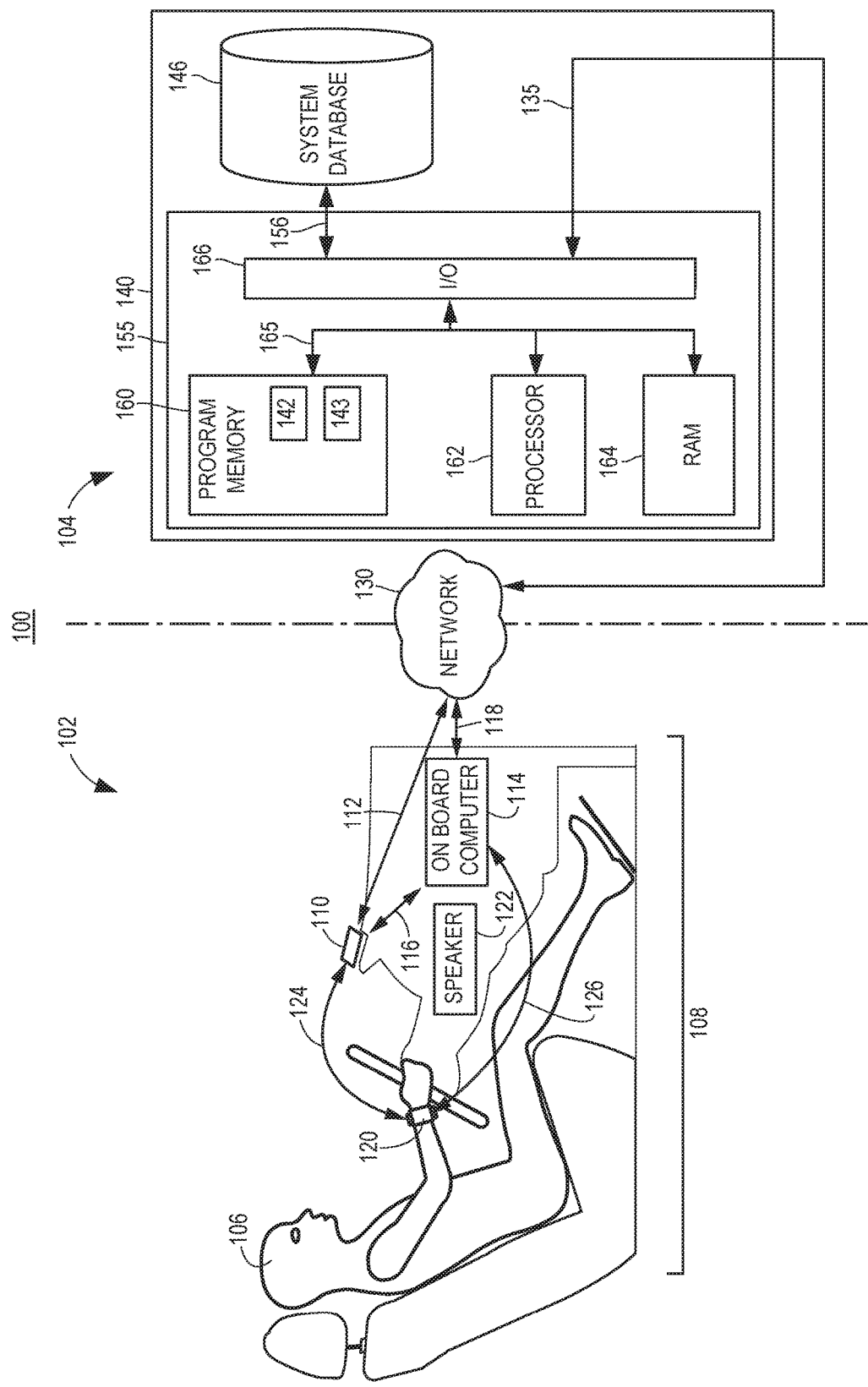

FIG. 1 illustrates a block diagram of an exemplary vehicle operator emotion management system 100. The high-level architecture includes both hardware and software applications, as well as various data communications channels for communicating data between the various hardware and software components. The vehicle operator emotion management system 100 may be roughly divided into front-end components 102 and back-end components 104. The front-end components 102 monitor a vehicle operator 106 for indications of an impaired emotional state using data from a physiological sensor 120 or various additional sensors (not shown) within a vehicle 108 (e.g., a car, truck, etc.). The front-end components 102 may further process the sensor data using a mobile device 110 or on-board computer 114 to determine whether the vehicle operator 106 is in an impaired emotional state. When an impaired emotional state is determined to exist, appropriate response stimuli to improve the emotional state of the vehicle operator 106 may be determined using the mobile device 110 or on-board computer 114. The response stimuli may include music or other sound recordings presented using a speaker 122. In some embodiments of the system, the front-end components 102 may communicate with the back-end components 104 via a network 130. The back-end components 104 may use one or more servers 140 to process the sensor data provided by the front-end components 102 to determine the emotional state of the vehicle operator 106 and communicate the determination of an impaired emotional state to the front-end components 102 via the network 130. Additionally, or alternatively, the back-end components 104 may determine appropriate response stimuli to present to the vehicle operator 106. Response stimuli information may be stored either in the front-end components or streamed to the front-end components via network 130.

The front-end components 102 are disposed within one or more mobile devices 110 or on-board computers 114, which may be permanently or removably installed in the vehicle 108. The mobile device 110 or the on-board computer 114 may interface with one or more physiological sensors 120 or various other sensors (not shown) in the vehicle 108 (e.g., a braking sensor, a speedometer, a tachometer, an accelerometer, an optical sensor, a microphone, etc.), which sensors may also be incorporated within or connected to the mobile device 110 or the on-board computer 114. In some embodiments, the physiological sensor 120 may be permanently installed within the vehicle 108. In other embodiments, the other sensors (not shown) may perform part or all of the functions of the physiological sensor 120, in which case the physiological sensor 120 may not be present. Further, the physiological sensor 120 or other sensors (not shown) within the vehicle 108 may be installed by the manufacturer of the vehicle 108 or as an aftermarket modification to the vehicle 108. The mobile device 110 or the on-board computer 114 may further interface with various output devices in the vehicle 108, such as one or more speakers 122 or displays (not shown). The physiological sensor 120 may include a thermometer, microphone, thermal image capture device, electroencephalograph (EEG), galvanic skin response (GSR) sensor, heart rate sensors, respiratory rate sensor, or other biometric sensors. The sensors may also include other sensors currently existing or later developed.

The on-board computer 114 may supplement the functions performed by the mobile device 110 described herein by, for example, sending or receiving information to and from the mobile device 110 or the physiological sensor 120. In one embodiment, the on-board computer 114 may perform all of the functions of the mobile device 110 described herein, in which case no mobile device 110 may be present in the system 100. In another embodiment, the mobile device 110 may perform all of the functions of the on-board computer 114, in which case no on-board computer 114 may be present in the system 100. The mobile device 110 or on-board computer 114 may communicate with the network 130 over links 112 and 118, respectively. Additionally, the mobile device 110 and on-board computer 114 may communicate with one another directly over link 116.

The mobile device 110 may be either a general-use mobile personal computer, cellular phone, smart phone, tablet computer, or wearable device (e.g., a watch, glasses, etc.) or a dedicated vehicle operator impairment monitoring computer. The on-board computer 114 may be a general-use on-board computer capable of performing many functions relating to vehicle operation or a dedicated vehicle operator impairment monitoring computer. Further, the on-board computer 114 may be installed by the manufacturer of the vehicle 108 or as an aftermarket modification to the vehicle 108. In some embodiments, the mobile device 110 or on-board computer 114 may be thin-client devices which outsource some or most of the processing to the server 140.

One or more vehicle operators 106 may operate the vehicle 108. While shown in a slightly reclined sitting position, those of ordinary skill in the art will appreciate that the vehicle operator 106 could be situated in any number of ways (e.g., reclining at a different angle, standing, etc.) and may operate the vehicle 108 using controls other than the steering wheel and pedals shown in FIG. 1 (e.g., one or more sticks, yokes, levers, etc.).

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol. The back-end components 104 include one or more servers 140. Each server 140 may include one or more computer processors adapted and configured to execute various software applications and components of the vehicle operator emotion management system 100, in addition to other software applications. The server 140 may further include a database 146, which may be adapted to store data related to the operation of the vehicle operator emotion management system 100. Such data might include, for example, images, sensor inputs, data analyzed according to the methods discussed below, or other kinds of data pertaining to the vehicle operator emotional impairment uploaded to the server 140 via the network 103. Such data might further include information related to vehicle operator emotional responses to various stimuli, including songs, audio recordings, broadcast stations, radio programs, podcasts, musical genres, types of recordings, etc. The server 140 may access data stored in the database 146 when executing various functions and tasks associated with the operation of the vehicle operator emotion management system 100.

Although the vehicle operator emotion management system 100 is shown to include one mobile device 110, one on-board computer 114, one physiological sensor 120, and one server 140, it should be understood that different numbers of mobile devices 110, on-board computers 114, physiological sensors 120, and servers 140 may be utilized. For example, the system 100 may include a plurality of servers 140 and hundreds of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide several advantages, such as enabling near real-time uploads and downloads of information as well as periodic uploads and downloads of information. This may in turn provide for a thin-client embodiment of the mobile device 110 or on-board computer 114 discussed herein. Alternatively, the vehicle operator emotion management system 100 may include only the front-end components 102. For example, a physiological sensor 120 may provide data to a mobile device 110 or on-board computer 114, which may perform all of the processing associated with receiving sensor data, determining whether the vehicle operator 106 is in an impaired emotional state, selecting appropriate mediating stimuli, and presenting the stimuli to the vehicle operator 106 through a speaker 122. As such, the vehicle operator emotion management system 100 may be a "standalone" system, neither sending nor receiving information over the network 130.

The server 140 may have a controller 155 that is operatively connected to the database 146 via a link 156. It should be noted that, while not shown, additional databases may be linked to the controller 155 in a known manner. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications may include a client application 142 for implementing the vehicle operator emotion management system 100 on the server 140. The software applications may further include a web server application 143 responsible for generating data content to be included in web pages sent from the web server 140 to the mobile device 110 or on-board computer 114. The various software applications may be executed on the same computer processor as the client application 142 or the web server application 143, or the software application may be executed on different computer processors.

Figure 2:
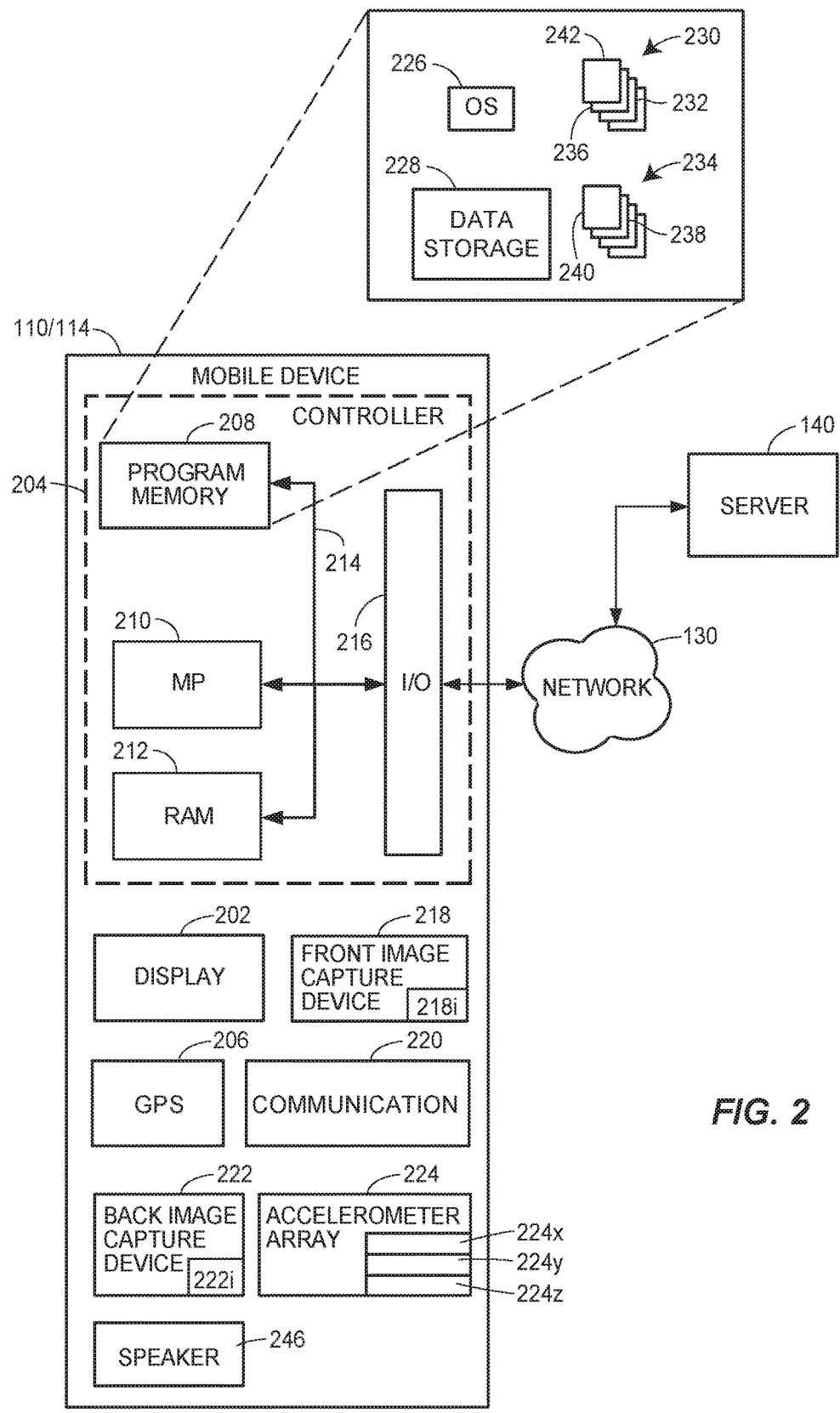
FIG. 2 illustrates a block diagram of an exemplary mobile device or on-board computer.

FIG. 2 illustrates a block diagram of a mobile device 110 or an on-board computer 114 for implementing the system for managing vehicle operator emotions by receiving sensor data, determining an impaired emotional state, and presenting appropriate stimuli to mediate the emotional state. The sensor data may come from sensors incorporated within the mobile device 110 or on-board computer 114. Additionally, or alternatively, the communication unit 220 may receive sensor data from one or more external sensors within the vehicle 108 or from the physiological sensor 120. The sensor data are processed by the controller 204 to determine whether the vehicle operator 106 is in an impaired emotional state. When the controller 204 determines that operator impairment exists, appropriate stimuli are selected from the data storage using the controller 204. The mobile device 110 or on-board computer 114 then provides the stimuli to the vehicle operator 106 using the speaker 246 or other appropriate output device. Additionally, or alternatively, the mobile device 110 or on-board computer 114 may transmit the sensor data to the server 140 for processing or may receive stimuli selected by the server 140 for presentation to the vehicle operator 106 via the network 130.

The mobile device 110 or on-board computer 114 may include a display 202, a Global Positioning System (GPS) unit 206, a communication unit 220, a front image capture device 218, a back image capture device 222, an accelerometer array 224, one or more additional sensors (not shown), a user-input device (not shown), a speaker 246, and, like the server 140, a controller 204. The mobile device 110 and on-board computer 114 may be integrated into a single device, or either can perform the functions of both. It will be appreciated that functions performed by either the mobile device 110 or the on-board computer 114 may also be performed by the mobile device 110 in concert with the on-board computer 114.

Similar to the controller 155, the controller 204 includes a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and a plurality of software routines 234. The operating system 226, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 228 may include data such as user profiles and preferences, application data for the plurality of applications 230, routine data for the plurality of routines 234, and other data necessary to interact with the server 140 through the digital network 130. In some embodiments, the controller 204 may also include, or otherwise be communicatively connected to, other data storage mechanisms (e.g., one or more hard disk drives, optical storage drives, solid state storage devices, etc.) that reside within the mobile device 110 or on-board computer 114.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although the FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The communication unit 220 may communicate with one or more external sensors within the vehicle 108, mobile devices 110, on-board computers 114, physiological sensors 120, or servers 140 via any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 220 may also be capable of communicating using a near field communication standard (e.g., ISO/IEC 18092, standards provided by the NFC Forum, etc.). Further, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, physiological sensors 120, or servers 140.

The GPS unit 206 may use "Assisted GPS" (A-GPS), satellite GPS, or any other suitable global positioning protocol (e.g., the GLONASS system operated by the Russian government) or system that locates the position the mobile device 110 or on-board computer 114. For example, A-GPS utilizes terrestrial cell phone towers or Wi-Fi hotspots (e.g., wireless router points) to more accurately and more quickly determine location of the mobile device 110 or on-board computer 114 while satellite GPS generally are more useful in more remote regions that lack cell towers or Wi-Fi hotspots. The front and back image capture devices 218 and 222 may be built-in cameras within the mobile device 110 or on-board computer 114 or may be peripheral cameras, such as webcams, cameras installed inside the vehicle 108, cameras installed outside the vehicle 108, etc., that are communicatively coupled with the mobile device 110 or on-board computer 114. The front image capture device 218 may be oriented toward the vehicle operator 106 to observe the vehicle operator 106 as described below. The back image capture device 222 may be oriented toward the front of the vehicle 108 to observe the road, lane markings, or other objects in front of the vehicle 108. Some embodiments may have both a front image capture device 218 and a back image capture device 222, but other embodiments may have only one or the other. Further, either or both of the front image capture device 218 and back image capture device 222 may include an infrared illuminator 218$i$, 222$i$, respectively, to facilitate low light or night image capturing. Such an infrared illuminator 218$i$, 222$i$ may be automatically activated when light is insufficient for image capturing. The accelerometer array 224 may be one or more accelerometers positioned to determine the force and direction of movements of the mobile device 110 or on-board computer 114. In some embodiments, the accelerometer array 224 may include an X-axis accelerometer 224$x$, a Y-axis accelerometer 224$y$, and a Z-axis accelerometer 224$z$ to measure the force and direction of movement in each dimension respectively. It will be appreciated by those of ordinary skill in the art that a three dimensional vector describing a movement of the mobile device 110 or on-board computer 114 through three dimensional space can be established by combining the outputs of the X-axis, Y-axis, and Z-axis accelerometers 224$x, y, z$ using known methods. The GPS unit 206, the front image capture device 218, the back image capture device 222, the accelerometer array 224, and the one or more other sensors (not shown) may be referred to collectively as the "sensors" of the mobile device 110 or on-board computer 114. Of course, it will be appreciated that additional GPS units 206, front image capture devices 218, back image capture devices 222, or accelerometer arrays 224 may be added to the mobile device 110 or on-board computer 114.

Further, the mobile device 110, on-board computer 114, or physiological sensor 120 may also include (or be coupled to) other sensors such as a thermometer, microphone, thermal image capture device, electroencephalograph (EEG), galvanic skin response (GSR) sensor, heart rate sensor, other biometric sensors, etc. A thermometer or thermal image capture device may be used to determine an abnormal vehicle operator 106 body temperature or a change in the vehicle operator's 106 body temperature. A microphone may be used to receive voice inputs, and may also be used to detect irregularities in the voice of the vehicle operator 106 indicating that vehicle operator 106 is agitated or under stress. An EEG may be used to determine whether a vehicle operator 106 is stressed, distracted, or otherwise impaired. A GSR sensor may be used to detect whether the vehicle operator 106 is stressed (i.e., that the conductance of the vehicle operator's 106 skin has varied from its normal level). Other biometric sensors may similarly be used to detect whether a vehicle operator 106 is in an impaired emotional state. The sensors of the mobile device 110 and the on-board computer 114, together with the physiological sensor 120 and any additional sensors within the vehicle 108 that are communicatively connected to the mobile device 110 or the on-board computer 114, may be referred to collectively as the "sensors" of the vehicle operator emotion management system 100.

The user-input device (not shown) may include a "soft" keyboard that is displayed on the display 202 of the mobile device 110 or on-board computer 114, an external hardware keyboard communicating via a wired or a wireless connection (e.g., a Bluetooth keyboard), an external mouse, or any other suitable user-input device. The user-input device (not shown) may also include a microphone capable of receiving user voice input.

The one or more processors 210 may be adapted and configured to execute any of one or more of the plurality of software applications 230 or any one or more of the plurality of software routines 234 residing in the program memory 204, in addition to other software applications. One of the plurality of applications 230 may be a client application 232 that may be implemented as a series of machine-readable instructions for performing the various tasks associated with implementing the vehicle operator emotion management system 100 as well as receiving information at, displaying information on, and transmitting information from the mobile device 110 or on-board computer 114. The client application 232 may function to implement a stand-alone system or as a system wherein the front-end components 102 communicate with back-end components 104 as described herein. The client application 232 may include machine-readable instruction for implementing a user interface to allow a user to input commands to and receive information from vehicle operator emotion management system 100. One of the plurality of applications 230 may be a native web browser 236, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 140. Another application of the plurality of applications may include an embedded web browser 242 that may be implemented as a series of machine-readable instructions for receiving, interpreting, and displaying web page information from the server 140. One of the plurality of routines may include an image capture routine 238 that coordinates with the front image capture device 218 or back image capture device 222 to retrieve image data for use with one or more of the plurality of applications, such as the client application 232, or for use with other routines. Another routine in the plurality of routines may include an accelerometer routine 240 that determines the force and direction of movements of the mobile device 110 or on-board computer 114. The accelerometer routine 240 may process data from the accelerometer array 224 to determine a vector describing the motion of the mobile device 110 or on-board computer 114 for use with the client application 232. In some embodiments where the accelerometer array 224 has X-axis, Y-axis, and Z-axis accelerometers $224x$, $y$, and z, the accelerometer routine 240 may combine the data from each accelerometer $224x$, $y$, and z to establish a vector describing the motion of the mobile device 110 or on-board computer 114 through three dimensional space. Furthermore, in some embodiments, the accelerometer routine 240 may use data pertaining to less than three axes, such as when determining when the vehicle 108 is braking.

A user may launch the client application 232 from the mobile device 110 or on-board computer 114, to access the server 140 to implement the vehicle operator emotion management system 100. Additionally, the user may also launch or instantiate any other suitable user interface application (e.g., the native web browser 236, or any other one of the plurality of software applications 230) to access the server 140 to realize the vehicle operator emotion management system 100.

In embodiments where the mobile device 110 or on-board computer 114 is a thin-client device, the server 140 may perform many of the processing functions remotely that would otherwise be performed by the mobile device 110 or on-board computer 114. In such embodiments, the mobile device 110 or on-board computer 114 may gather data from its sensors or other sensors as described herein, but, rather than analyzing the data locally, the mobile device 110 or on-board computer 114 may instead send the data to the server 140 for remote processing. The server 140 may perform the analysis of the gathered data to determine whether the vehicle operator 106 may be in an emotionally impaired state. If the server 140 determines that the vehicle operator 106 may be in an emotionally impaired state, the server 140 may select appropriate ameliorative stimuli and command the mobile device 110 or on-board computer 114 to present the stimuli to the vehicle operator 106 as described below. Additionally, the server 140 may generate metrics and suggestions regarding vehicle operator emotional impairment based on the gathered data.

Figure 3:
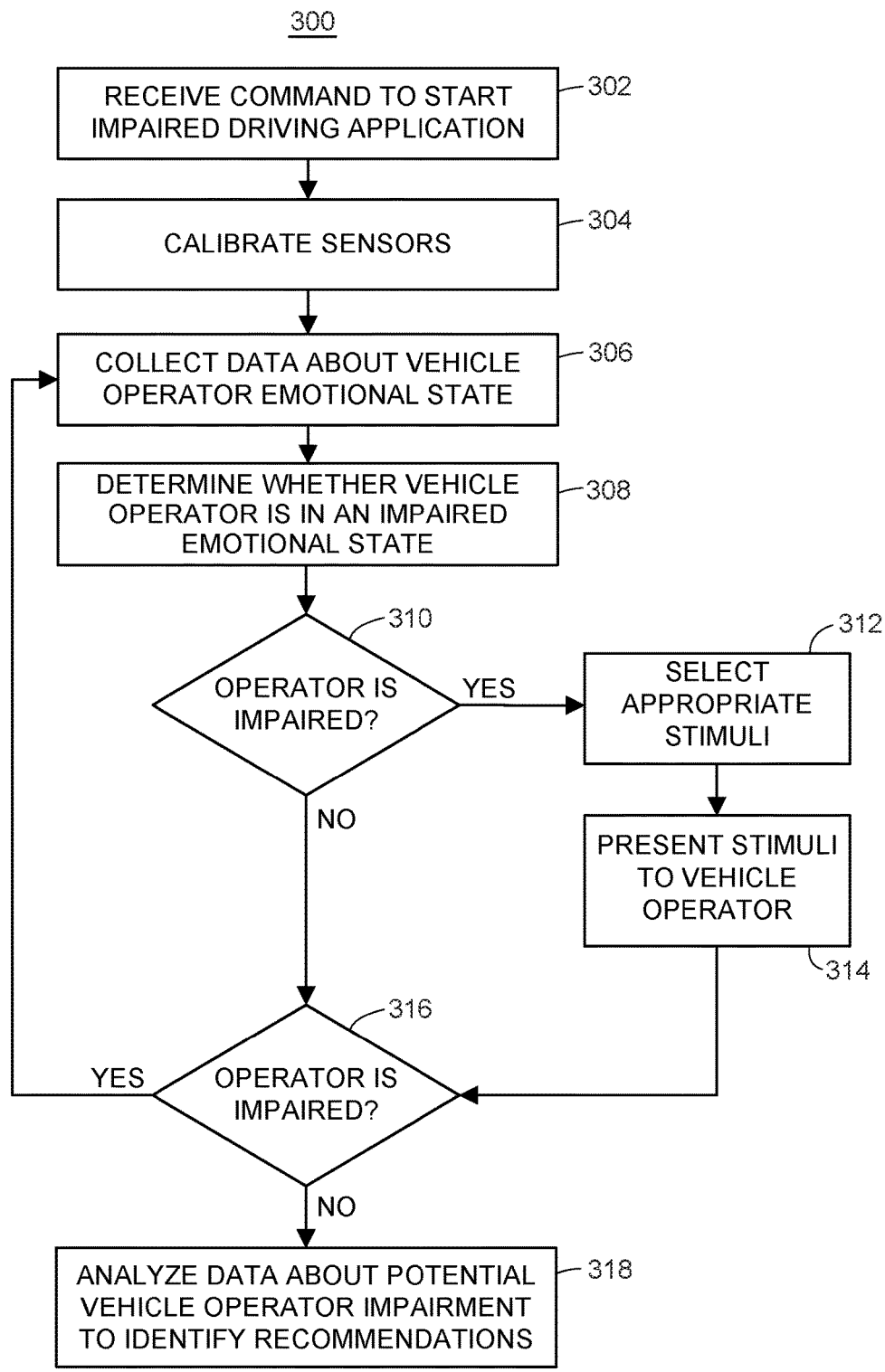
FIG. 3 depicts an exemplary vehicle operator emotion management method in accordance with the presently described embodiments.

FIG. 3 is a flow diagram depicting an exemplary embodiment of a vehicle operator emotion management method 300 implemented by the vehicle operator emotion management system 100. More particularly the method 300 may be performed by the mobile device 110 or on-board computer 114 or by either or both of these in conjunction with the server 140. The method 300 may be initiated by a command (block 302), following which the sensors may be calibrated (block 304). When in operation, the method 300 collects sensor data about the emotional state of the vehicle operator 106 (block 306) and processes the sensor data to determine whether the vehicle operator 106 is in an impaired emotional state (block 308). When an impairment is determined to exist (block 310), the method 300 selects appropriate response stimuli to manage the emotional state of the vehicle operator 106 (block 312) and then presents the stimuli to the vehicle operator 106 (block 314). In the exemplary embodiment, the method 300 continues to monitor the emotional state until the trip is complete (block 316), but other embodiments may continue monitoring for an extended period or may terminate monitoring prior to the completion of the trip under certain circumstances. Either during or after vehicle operation, sensor data or determinations of emotional impairment may be stored and analyzed to identify trends in the emotional states of the vehicle operator 106 (block 318).

The command to start the vehicle operator emotion management method 300 may be a user command received by the mobile device 110 or on-board computer 114 via the client application 232. Alternatively or additionally, the command may be sent by the server 140 or may be generated automatically by the mobile device 110 or on-board computer 114 after the meeting of a condition (e.g., the vehicle 108 has been started; the mobile device 110 is within a specified distance from the vehicle, a certain time, etc.). In some embodiments, the vehicle operator emotion management system may continuously collect sensor data following a first command to initiate a client application 232 but may only perform method 300 following a second command (block 302). In such embodiments, the sensors may be calibrated both after the first command and after the second command.

Following initiation of the method 300, the physiological sensor 120 and the sensors of the mobile device 110 or on-board computer 114 may be calibrated (block 304). For example the front image capture device 218 may attempt to detect the face and eyes of the vehicle operator 106. Calibration may further entail adjusting the front image capture device 218 to account for the vehicle operator's 106 skin tone or facial characteristic, ambient light in the vehicle, the background behind the vehicle operator 106, etc. The back image capture device 222 may also be calibrated, such as by attempting to detect a road in front of the vehicle, identify lane markings, identify other vehicles, detect coastlines or a water surface, or detect a horizon. Calibration may further entail adjusting the back image capture device 222 to account for the color of the road, road conditions (e.g., a wet road or an icy road), lane markings, wind speed, wave height, cloud cover, time of day, ambient light, precipitation, etc. The accelerometer array 224 may also be calibrated. Such calibration may entail accounting for constant vibration (e.g., the vibration caused by the engine of the vehicle 108) or other repetitive forces applied to the mobile device 110 or on-board computer 114. The physiological sensor 120 or other biometric sensors may be calibrated by measuring the vehicle operator's 106 pulse rate, respiratory rate, skin conductance, etc. Other sensors may similarly be calibrated upon initialization of the method 300 or at intervals during monitoring. Changes in the sensor measurements from the baseline established during calibration may indicate the vehicle operator 106 is entering or has entered an impaired emotional state. Previously measured sensor data stored in the data storage 228 of the mobile device 110 or the on-board computer 114 or stored in the system database 146 of the server 140 may also be used for calibration. Calibration with previously established baseline measurements is of particular use where a vehicle operator 106 is in an emotionally impaired state at the time of calibration.

After calibration, the mobile device 110 or on-board computer 114 may collect data about potential vehicle operator impairment using the physiological sensor 120 and other sensors within the vehicle 108 (block 306). Unmodified sensor data or determinations of the vehicle operator's emotional state derived therefrom may be stored or recorded in a log file by the mobile device 110, on-board computer 114, or server 140. Sensor data received by sensors connected to one of the mobile device 110 or on-board computer 114 may be communicated to another mobile device 110 or on-board computer 114 for storage or processing. Sensor data may also be communicated to the server 140 via network 130 for storage or processing. Sensor data may include a raw or modified output signal from a physiological sensor 120 or any sensor incorporated within or communicatively connected to a mobile device 110 or on-board computer 114.

Upon receiving the sensor data, the mobile device 110, on-board computer 114, or server 140 processes the sensor data to determine whether the vehicle operator 106 is in an impaired emotional state (block 308). In one embodiment, the mobile device 110 or on-board computer 114 may receive sensor data and transmit the data to the server 140 via network 130, which may be stored in program memory 160 or RAM 164 and processed using processor 162 according to program instructions stored in the program memory 160. Alternatively, or in addition, the physiological sensor 120 may communicate sensor data to the mobile device 110 or on-board computer 114, where the sensor data may be processed or combined with other sensor data prior to transmission to the server 140. Sensor data may also be preprocessed by the mobile device 110 or on-board computer 114 before being sent to another mobile device 110 or on-board computer 114 or to the server 140 for processing to determine operator emotional state. Such pre-processing may include processing image data to determine pupil dilation or facial flushing, calculating a three-dimensional vector from accelerometer array 224 data, detecting proximity to other vehicles from a proximity sensor installed in the vehicle 108 or from image capture data, determining changes in vocal pitch from a microphone in the vehicle 108 or the mobile device 110, etc.

Figure 4:
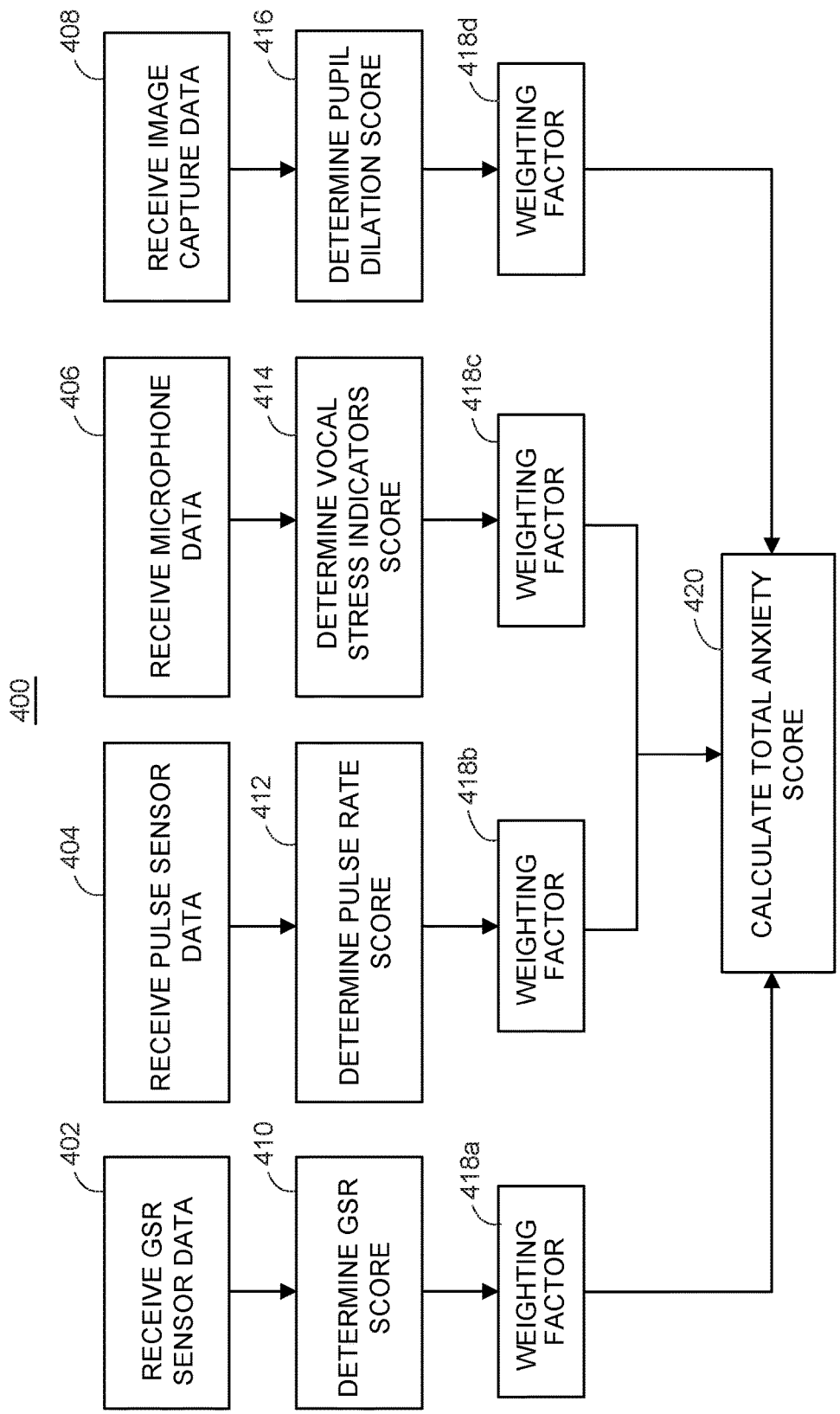
FIG. 4 depicts an exemplary vehicle operator total anxiety score determination method for implementing the vehicle operator emotion management method in accordance with the presently described embodiments.
Figure 5:
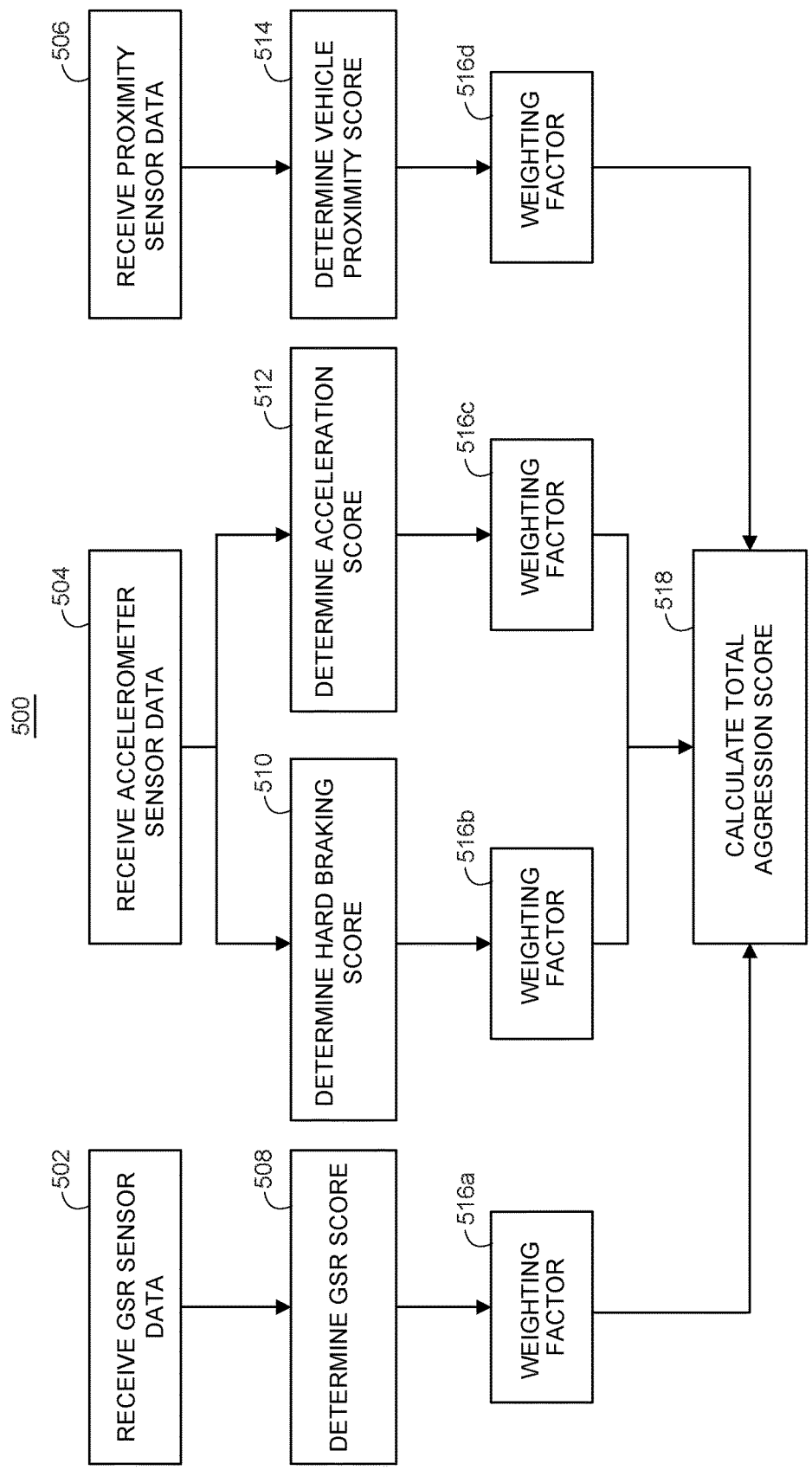
FIG. 5 depicts an exemplary vehicle operator total aggression score determination method for implementing the vehicle operator emotion management method in accordance with the presently described embodiments.

Determining whether the vehicle operator 106 is in an impaired emotional state may include separate but complimentary determinations such as whether the vehicle operator 108 is exhibiting signs of anxiety, as shown in FIG. 4, or aggression, as shown in FIG. 5. It will be appreciated by those of ordinary skill in the art that these determinations may be made within a single process as well. Furthermore, the methods of determining vehicle operator emotional state depicted in FIGS. 4 and 5 are exemplary only; additional or alternative methods may be used to determine whether the vehicle operator is in an emotionally impaired state and the type of such emotionally impaired state. In addition to sensor data, non-sensor information (e.g., traffic or weather conditions, local attractions or facilities, etc.) may be obtained from external sources via network 130.

FIG. 4 is a flow diagram depicting an exemplary embodiment of a vehicle operator total anxiety score determination method 400 implemented by the vehicle operator emotion management system 100 while processing sensor data about potential vehicle operator emotional impairment at block 308. The method 400 determines a GSR score (block 410), a pulse rate score (block 412), a vocal stress indicator score (block 414), and a pupil dilation score (block 416) using data from one or more sensors (blocks 402, 404, 406, and 408). The scores of these impairment indicators (GSR score, pulse rate score, vocal stress indicator score, and pupil dilation score) may then be weighted (blocks 418a-d) and combined to determine the total anxiety score (block 420). The GSR score may be determined by multiplying the GSR sensor output voltage in Volts, resistance in Ohms, or conductance in Siemens (block 402) by an appropriate conversion factor such that a baseline score of the vehicle operator 106 in a normal emotional state corresponds to a score of 50 points. The pulse rate score may be determined by multiplying the detected pulse rate by a conversion factor such that a baseline resting pulse rate score of the vehicle operator 106 corresponds to a score of 50 points. The vocal stress indicator score may be determined when the vehicle operator 106 is speaking by multiplying the measured average vocal pitch of the vehicle operator over a period of time (e.g., 2 seconds, 10 seconds, etc.) by a conversion factor such that a baseline unimpaired vehicle operator vocal pitch as determined by prior measurements corresponds to a score of 50 points. The vocal stress indicator score may be set at a default value when no vehicle operator speech is detected, or the prior score may be used until vehicle operator speech is detected or the trip is complete. The pupil dilation score may be determined by using the front image capture device to identify the pupil and estimate the diameter relative to a constant facial feature (e.g., the interpupillary distance) then multiplying the diameter by a conversion factor such that a baseline unimpaired vehicle operator pupil diameter as determined by prior measurements corresponds to a score of 50 points. Of course, any of these or other impairment indicator scores can be calculated by a variety of linear or nonlinear functions mapping the output range of each sensor to the range 0 points to 100 points or to any other convenient point scale.

After determining scores for the individual impairment indicators as discussed above, the method 400 may multiply each score by a weighting factor 418a, b, c, or d. For example, if each score is weighted equally, the weighting factors 418a-d will be identical. However, it may be advantageous to weight one score higher than another. For example, a higher vocal stress indicator score may more reliably indicate vehicle operator 106 anxiety than GSR or pulse rate scores, which may be high for reasons unrelated to anxiety (e.g., physical exertion, sweating in response to temperature, etc.). In such an embodiment, the weighting factors 410a-d may be 0.20, 0.20, 0.25, and 0.35 respectively. In some embodiments, the weighting factors may be adjusted based on previous data for the vehicle operator 106 or for a large group of users. The weighting factors may be adjusted by one of the many known learning algorithms such as a support vector machine or neural network algorithms. The method 400 may then sum the weighted scores to determine a total anxiety score (block 420). The total anxiety score may be logged with a timestamp and stored in data storage 228 or sent to the server 140 for remote storage. Referring again to FIG. 3, if the total anxiety score is above a maximum threshold value (e.g., 80 out of 100), the vehicle operator emotion management system 100 may determine that the vehicle operator 106 is in an emotionally impaired state (block 310). Additionally, if the total anxiety score is below a minimum threshold value (e.g., 20 out of 100), the vehicle operator emotion management system 100 may determine that the vehicle operator 106 is in an emotionally impaired state (block 310).

FIG. 5 is a flow diagram depicting an exemplary embodiment of a vehicle operator total aggression score determination method 500 implemented by the vehicle operator emotion management system 100 while processing sensor data about potential vehicle operator emotional impairment at block 308. The method 500 determines a GSR score (block 508), a hard braking score (block 510), an acceleration score (block 512), and a vehicle proximity score (block 514) using data from one or more sensors (blocks 502, 504, and 506). The scores of these impairment indicators (GSR score, hard braking score, acceleration score, and vehicle proximity score) may then be weighted (blocks 516a-d) and combined to determine the total anxiety score (block 518). The GSR score may be calculated by multiplying the GSR sensor output voltage in Volts, resistance in Ohms, or conductance in Siemens (block 402) by an appropriate conversion factor such that a baseline score of the vehicle operator 106 in a normal emotional state corresponds to a score of 50 points. The hard braking score may be calculated by adding 1 point to a default score (e.g. 50 points) every time the magnitude of negative acceleration in the direction of travel of the vehicle 108 exceeds a threshold during a certain period of time (e.g., 5 minutes). The acceleration score may be calculated by adding 1 point to a default score (e.g. 50 points) every time the magnitude of acceleration in the direction of travel of the vehicle 108 exceeds a threshold during a certain period of time (e.g., 5 minutes). The vehicle proximity score may be calculated by measuring the distance to another vehicle immediately ahead of the vehicle 108 using the back image capture device 222 or other sensors, determining the minimum safe distanced based on the speed and braking capabilities of the vehicle 108, and subtracting from a score of 100 the multiple of 100 times the ratio of measured distance to the vehicle immediately ahead to the determined minimum safe distance. Of course, it will be obvious that any of these or other impairment indicator scores can be calculated by a variety of linear or nonlinear functions mapping the output range of each sensor to the range 0 points to 100 points or to any other convenient point scale.

After determining scores for the individual impairment indicators as discussed above, the method 500 may multiply each score by a weighting factor 516a, b, c, or d. For example, if each score is weighted equally, the weighting factors 516a-d will be identical. However, it may be advantageous to weight one score higher than another. For example, a high vehicle proximity score may be more reliably indicate of aggressive vehicle operation than a hard braking score, which may be high for reasons unrelated to aggressive operation (e.g., hard braking by vehicles ahead, sudden lane changes by other vehicles, etc.). In such an embodiment, the weighting factors 410a-d may be 0.25, 0.20, 0.25, and 0.30 respectively. In some embodiments, the weighting factors may be adjusted based on previous data for the vehicle operator 106 or for a large group of users. The weighting factors may be adjusted by one of the many known learning algorithms such as a support vector machine or neural network algorithms. The method 500 may then sum the weighted scores to determine a total anxiety score (block 518). The total aggression score may be logged with a timestamp and stored in data storage 228 or sent to the server 140 for remote storage. Referring again to FIG. 3, if the total aggression score is above a maximum threshold value (e.g., 75 out of 100), the vehicle operator emotion management system 100 may determine that the vehicle operator 106 is in an emotionally impaired state (block 310). Additionally, if the total aggression score is below a minimum threshold value (e.g., 10 out of 100), the vehicle operator emotion management system 100 may determine that the vehicle operator 106 is in an emotionally impaired state (block 310).

Alternatively, it will be understood that instead of a weighted sum adding up to a total anxiety score or total aggression score, either may instead be a weighted sum that is subtracted from a maximum score. In such a case, the individual impairment indicator scores discussed above may be calculated differently. While FIGS. 4 and 5 describe embodiments of methods 400 and 500 using weighted sums to determine total anxiety or total aggression scores, respectively, other mathematical operations may be used to determine the total drowsiness or distractedness scores. While the exemplary embodiment discussed above uses a 100 point scale, it will be appreciated that a 100 point scale is just one of many point scales that could be used (e.g., 1 point scale, 50 point scale, 220 point scale, etc.). Alternative or additional sensors and impairment indicators may be used in the determination of the total anxiety score or total aggression score. For example, vehicle operator body temperature, vehicle operator arm movements, frequency of lane changes, failure to maintain lane centering, time to collision below a threshold, or swerve impairment indicators may be added to the calculation of the total anxiety or total aggression scores in a manner similar to that described above in connection with FIGS. 4 and 5. Additionally, or alternatively, emotional impairment scores other than the total anxiety and total aggression scores may be determined (e.g., preoccupation/distraction, lethargy, agitation, etc.).

The vehicle operator emotion management system 100 may permit the user to adjust the sensitivity setting for the total impairment scores. For example, the decision criteria may be set such that a total anxiety score must exceed 90 out of 100 to register an emotionally impaired state at block 310. Additionally or alternatively, the vehicle operator emotion management system 100 may include one of the many known learning algorithms such as support vector machine or neural network algorithms to adjust the individual threshold values (e.g., the hard braking or acceleration thresholds) or conversion factors (e.g., the GSR conversion factor or the pulse rate conversion factor) discussed in connection with FIGS. 4 and 5. The learning algorithm may operate in connection with the server 140 to adjust threshold levels, weighting factors, or sensitivity levels based on calculations performed using aggregated data from some or all of the mobile devices 110 or on-board computers 114 in the vehicle operator emotion management system 100.

Referring again to FIG. 3, when the vehicle operator emotion management system 100 determines that the vehicle operator 106 is in an impaired emotional state at block 310, the vehicle operator emotion management system 100 selects appropriate stimuli to manage the emotional impairment (block 312). The stimuli may consist of any music, other sound recordings (e.g., radio shows, sports broadcasts, personalized messages, recorded ambient sounds, tones, etc.), telephone calls, suggested local destinations to stop (e.g., coffee shops, gas stations, restaurants, points of historical interest or scenic overlooks, etc.), visual stimuli (e.g., video, still images, dashboard lighting, ambient lighting within the vehicle, etc.), tactile stimuli (e.g., massage functions in a vehicle seat, etc.), temperature stimuli (e.g., blasts of hot or cold air through a vehicle ventilation system, heating or cooling elements in a vehicle seat, etc.), aromatic stimuli, or other stimuli that may affect the emotional state of the vehicle operator 106. The stimuli may be selected from a set stored on the mobile device 110 or on-board computer 114 or from a set stored on the server 140. Alternatively, or additionally, the stimuli may be selected from any source accessible by the mobile device 110, on-board computer 114, or server 140 via the internet or other communication connection (e.g., terrestrial or satellite radio, streaming music services, image or text sharing services, video hosting web services, etc.). In some embodiments, the selection of appropriate stimuli may include the determination of whether to present the stimuli immediately upon a determination of an impaired emotional state or whether to present the stimuli upon the conclusion of any similar stimuli being presented to the vehicle operator 106. For example, if a series of songs are selected as appropriate stimuli while another song is playing in the vehicle 108, the system 100 may determine to delay presentation of the series of songs until the other song concludes.

Figure 6:
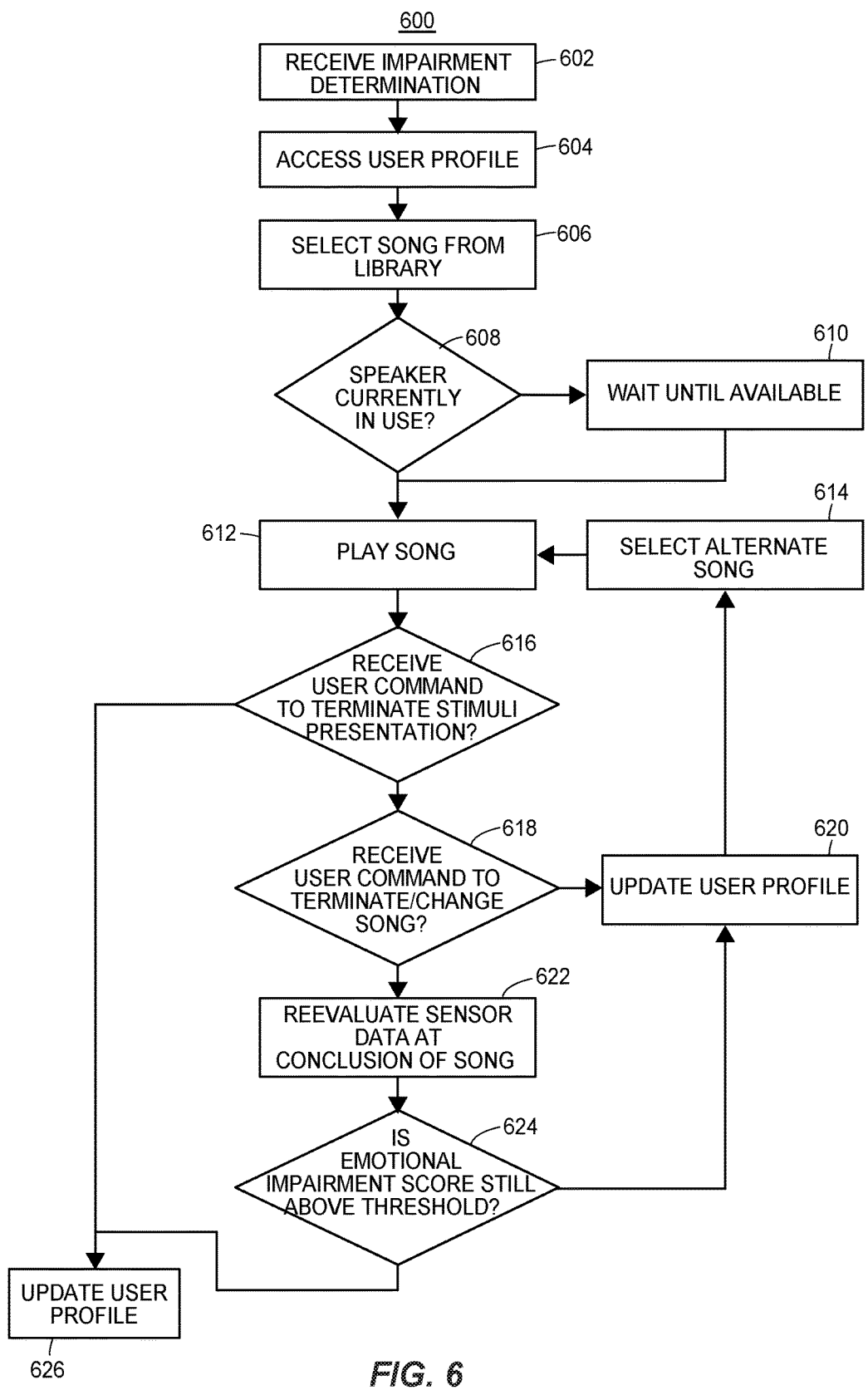
FIG. 6 depicts an exemplary vehicle operator emotion modification method for implementing the vehicle operator emotion management method in accordance with the presently described embodiments.

FIG. 6 is a flow diagram depicting an exemplary embodiment of an emotional stimuli selection method 600 implemented by the vehicle operator emotion management system 100 at block 312. Although method 600 presents an exemplary embodiment for selecting musical stimuli from a library of songs stored on the mobile device 100, on-board computer 114, or server 140, it will be appreciated by those of ordinary skill in the art that alternative stimuli may be used, including stimuli not stored on the mobile device 100, on-board computer 114, or server 140.

The emotional stimuli selection method 600 is initiated by the receipt of a determination that a vehicle operator 106 is in an impaired emotional state (block 602). In the presented embodiment, the method 600 then accesses a user profile containing preference and previous response data regarding the vehicle operator 108 (block 604). Alternatively, the profile data may be accessed at the time of initializing the vehicle operator emotion management method 300 is initiated. The user profile may contain data relevant to the selection of appropriate stimuli, including: songs the user has recently played; characteristics of the songs (e.g., genre, tempo, duration, etc.); sensor data corresponding to the user's response to listening to songs on previous occasions; and time, location, and external conditions (e.g., weather, traffic, construction, light and sound levels, etc.) associated with previous user responses. Where a user profile for the vehicle operator 108 is unavailable or otherwise is not used in the method, a general user profile may instead be used, or a user profile may be generated using available data (e.g., location, type of mobile device used, type of vehicle, biometric sensor data, etc.).

In some embodiments, the user profile may be initially generated during a training period prior to implementation of the vehicle operator emotion management method 300. The training period may last for a predetermined duration (e.g., two weeks, ten hours of sensor data, etc.) or until sufficient data has been collected to establish a user profile that meets minimum usability criteria (e.g., 10,000 total sensor data points, a coefficient of determination $R^2$ above 0.5, etc.). During the training period, the system 100 may receive, process, and store sensor data using the mobile device 110, on-board computer 114, or server 140. The user profile may be stored locally in the data storage 228 of the mobile device 110 or on-board computer 114, or the user profile may be stored on the server in the system database 146. A local copy of the user profile may also be generated or updated in the data storage 228 and used to update the system database 146 at convenient intervals. The training period may involve passive recording of sensor data in conjunction with information regarding various stimuli (e.g., music, radio stations, telephone calls, etc.). Additionally, or alternatively, the training period may involve gathering active input from the user, such as user ratings of songs or user decisions on whether to play or skip songs suggested by the system. For example, a user may use a touch-sensitive display on a mobile device 110 to rate the song by selecting one of multiple virtual buttons. A generic user profile or a baseline user profile based on user and vehicle characteristics may also be used as a starting point to be supplemented by data during the training period, thereby potentially decreasing the length of the training period.

Once the user profile has been accessed, the method 600 selects a first stimulus from a library of potential stimuli based upon the sensor data and the user profile (block 604). In the exemplary embodiment of FIG. 6, this involves the selection of a song from a library of songs stored on a computer-readable storage medium accessible by the mobile device 110, on-board computer 114, or server 140. The selection may be made by using one of the many known learning algorithms such as support vector machines (SVM) or neural network algorithms to predict probable user responses to potential stimuli. The potential stimuli may then by sorted based at least in part on the likely response of the vehicle operator 106 to each, and the potential stimulus with the most desired expected results (e.g., highest probability of reducing all total impairment scores below specified thresholds, greatest expected value of the decrease in one or more total impairment scores, etc.) may be selected. Alternatively, the selection may be made by first determining the characteristics of a potential stimulus most strongly correlated with the desired changes in sensor measurements regarding vehicle operator emotional state (e.g., a reduction in heart rate or hard braking, an increase in distance between vehicles, etc.) and then selecting a stimulus best matching such characteristics. Any of the many known machine learning algorithms, regression analysis techniques, or other similar methods may be employed to process the user profile and sensor data to select a first stimulus to present to the vehicle operator 106.

In some embodiments, the method 600 may then determine whether the speakers 122 and 246, display 202, or other presentation device is then in use (block 608). Where the speaker, display, or other device is in use, the method 600 may wait until the device is available (block 610). For example, if a song is playing through the vehicle speakers 122, the song selected in block 606 may be queued to play following the completion of the presently playing song, rather than interrupt the presently playing song. This is done in part to provide a less intrusive experience for the user. Alternatively, the song or other stimulus may be presented immediately in some or all circumstances, such as when sensor data indicate rapidly escalating emotional impairment.

The song or other stimulus is then presented to the vehicle operator 106 using the speakers 122 or 246, display 202, or other presentation device in the vehicle 108 (block 612). During presentation of the first or subsequent stimulus, the system 100 may provide a means for the vehicle operator 106 to rate the song or other stimulus being presented. Also during presentation of the stimuli, the system 100 may provide a means to terminate all stimuli presentation or to terminate the current stimulus and select a different stimulus. For example, the vehicle operator 106 may switch to another song or stop playback by speaking a command (e.g., "play next," "music off," etc.), which command is detected by a microphone within the vehicle 108. When a command to stop all stimuli is received from the vehicle operator 106 (block 616), the method 600 may terminate the presentation of the stimulus and cause the user profile to be updated to include the decision and the sensor data at the time of termination (block 626). The selection and presentation of stimuli in method 600 may then be suppressed for the remainder of the trip. In some embodiments, a reset timer may be used to suppress the presentation of additional stimuli using method 600 until a specified period of time has elapsed (e.g., 30 minutes, 2 hours, etc.) following termination of the method 600. Similarly, when a command to stop the current stimulus is received from the vehicle operator 106 (block 618), the user profile may be updated (block 620) and a new stimulus may be selected using the method described above (block 614). The current stimulus may then be terminated and the new stimulus may be immediately presented to the vehicle operator 106 (block 612). In some embodiments, the method may alter or limit the use of prior data in selecting stimuli if multiple commands to stop the current stimulus are received within a set period (e.g., three commands within two minutes). In such embodiments, additional stimuli may be selected from a subset of the library excluding stimuli similar to the rejected stimuli or may be selected using an alternative user profile.

Upon the conclusion of each stimulus or at various points during stimulus presentation, the method 600 may reevaluate the sensor data to determine whether the vehicle operator is in an impaired emotional state using the method described above (block 622). If the vehicle operator 106 is determined to be in an emotionally impaired state at block 624, then the additional sensor data and information regarding the stimulus may be used to update the user profile (block 620), and an additional stimulus may be selected and presented using the method described above (blocks 614 and 612). If the vehicle operator 106 is determined no longer to be in an emotionally impaired state at block 624, then the additional sensor data and information regarding the stimulus may be used to update the user profile (block 626), and the method 600 may be terminated. In some embodiments, the method 600 may also terminate after a specified period of time (e.g., 30 minutes, 1 hour, etc.), regardless of the emotional state of the vehicle operator 106. As noted above, a reset timer may be used to suppress the presentation of additional stimuli using method 600 until a specified period of time has elapsed (e.g., 30 minutes, 2 hours, etc.) following termination of the method 600.

It will be understood that this method 600 may be performed by either hardware or software interacting with hardware and by a variety of means, with appropriate modifications. Additionally, the steps presented in the exemplary embodiment may be performed in a different order, combined, or eliminated without materially modifying the method of selecting appropriate stimuli to manage the emotional state of a vehicle operator 106 using a variety of sensor data regarding the vehicle operator or vehicle operation. Furthermore, additional or alternative stimuli may be used to augment or replace the musical stimuli in the exemplary embodiment of method 600.

Referring again to FIG. 3, upon selection of appropriate emotional stimuli to manage the vehicle operator's emotional state (block 312), one or more stimuli may be presented to the vehicle operator 106 using speaker 122, speaker 246, display 202, or other output device within the vehicle 108. In some embodiments, the stimuli may be selected by a mobile device 110, on-board computer 114, or server 140 and then transmitted to a different mobile device 110 or on-board computer 114 for presentation to the vehicle operator 106. Additionally, or alternatively, a transient computer-readable signal may be used to stream an encoded representation of the stimuli to be transmitted from a storage 228 to a mobile device 110 or on-board computer 114 for presentation to the vehicle operator 106. In some embodiments, the server 140 may select appropriate stimuli and transmit the determination or stream a representation of the stimuli to the mobile device 110 or the on-board computer 114. Where the selected stimulus consists of media or another stimulus from a source external to the vehicle operator emotion management system 100 (e.g., podcast, Internet music service, terrestrial or satellite radio, telephone call, video sharing service, etc.), then the mobile device 110 or on-board computer 114 may be caused to access the external source either directly or through the server 140. Where a stimulus consists of text (e.g., an SMS text message, news story, status update through a social networking service, etc.), such stimulus may be presented as an automatically generated spoken version of the text.

The system 100 may continue to present stimuli until the sensor data indicate the emotional state of the vehicle operator 106 has returned to an acceptable range. Additionally, the stimuli may continue until a time-out threshold (e.g., 5 minutes, 10 minutes, etc.) has been reached or until disabled by the vehicle operator 106. Where the vehicle operator 106 may disable the stimuli by providing a shut-off command, such shut-off command may include the following: depressing a button of the mobile device 110 or on-board computer 114, touching a display 202 or other input device (not shown), making a gesture observable by the front image capture device 218, speaking a command observable by a microphone (not shown) of the mobile device 110 or on-board computer 114, stopping the vehicle 108, terminating the client application 232, etc.

The vehicle operator emotion management system 100 may continue to gather and analyze data while a particular trip is ongoing (block 316). The trip may become completed by a user command (e.g., the user selects a "Stop" button on the mobile device 110 or on-board computer 114) or automatically (e.g., the on-board computer 114 detects that the engine of the vehicle 108 has stopped). When the trip is complete, the vehicle operator emotion management system 100 may analyze the data collected during the just completed trip along with data from previous trips to provide metrics and suggestions to the user. For example, the vehicle operator emotion management system 100 may analyze thirty trips over the course of two weeks and determine that the user tends to be most agitated around the hours of 1 P.M. and 7 P.M. Accordingly, the vehicle operator emotion management system 100 may present stimuli to reduce agitation around those times even in the absence of strong sensor data indicating an emotionally impaired state. The new data may also be used to update the vehicle operator baseline, preferences profile, or algorithms for determining emotional state or selecting appropriate stimuli. For example, the vehicle operator emotion management system 100 may record that the vehicle operator 106 reacted negatively to a particular stimulus presented and avoid presentation of such stimuli in similar circumstances during future trips.

FIGS. 7-13 depict client application pages or screens that may be displayed on the display 202 of the mobile device 110 as part of the user interface used to implement the vehicle operator impairment monitoring system 100. While FIGS. 7-13 depict client application pages or screens being displayed on the display 202 of the mobile device 110, it will be understood that the client application pages or screens could be displayed on additional displays, including displays 202 of the on-board computer 114. The client applications or pages may be generated by the mobile device 110 or on-board computer 114, or they may be sent to the mobile device 110 by the server 140 (e.g., as with a thin client). The user may launch the client application 232 from the mobile device 110 or on-board computer 114 via any suitable manner, such as touch-selecting a client application icon (not shown) on the display 202 or speaking a voice command into a microphone (not shown). After the user launches the client application 232, the client application 232 may begin to run on the mobile device 110 or on-board computer 114 as described above in connection with block 302 of FIG. 3.

Figure 7:
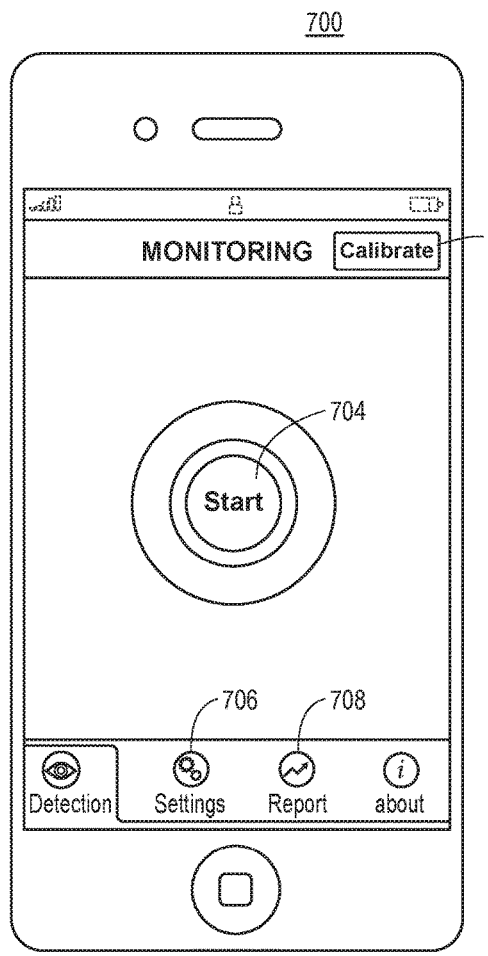
FIGS. 7-13 depict embodiments of user interface screens associated with a client application for implementing the vehicle operator emotion management system in accordance with the presently described embodiments.

With reference now to FIG. 7, a home screen 700 of the client application 232 may be displayed on the display 202 of the mobile device 110. The home screen 700 may include a "Calibrate" button 702, a "Start" button 704, a "Settings" tab 706, and a "Report" tab 708. When the user selects the calibrate button 702 the client application 232 may execute a calibration routine at described above in connection with block 304.

Figure 8:
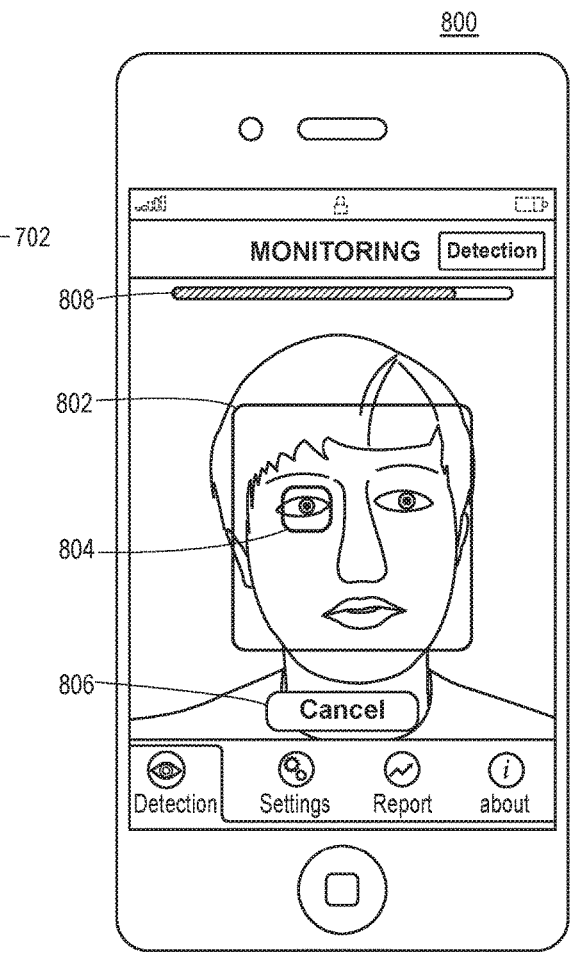

With reference now to FIG. 8, a calibration screen 800 of the client application 232 may be displayed on the display 202 of the mobile device 110 during a calibration routine executed in connection with block 304. The calibration screen 800 may include a face detection indicator 802, an eye detection indicator 804, a "Cancel" button 806, and a calibration progress indicator 808. While the client application 232 is executing the calibration routine discussed in connection with block 304, the calibration screen 800 may display a face detection indicator 802 showing on the display 202 the visual area perceived by the client application 232 to be the face of the user 106 or an eye detection indicator 804 showing on the display the visual area perceived by the client application 232 to be an eye of the user 106. If a user selects the cancel button 806, calibration may be terminated. A calibration progress indicator 808 may display an approximate indication of the status of the calibration routine.

Figure 9:
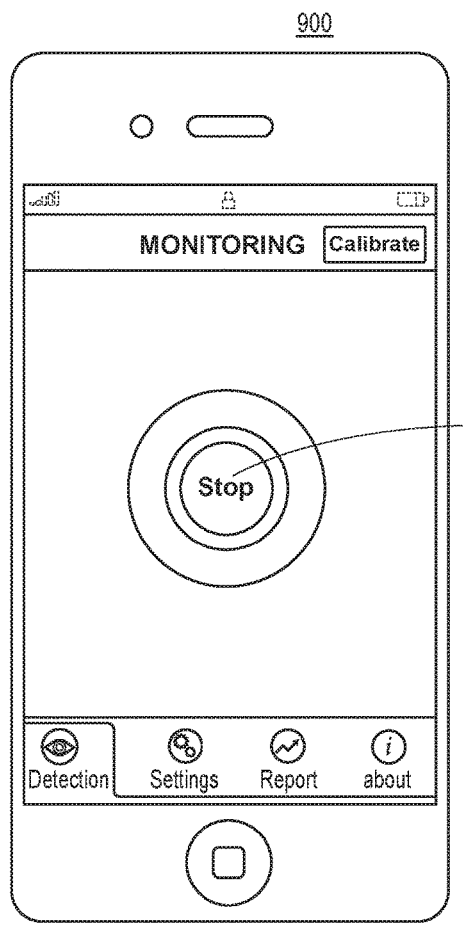

Referring again to FIG. 7 when the user selects the "Start" button 704, the client application 232 may begin to collect sensor data about the vehicle operator's emotional state, analyze the data, and present appropriate stimuli when the vehicle operator is determined to be in an emotionally impaired state (blocks 306-316). With reference now to FIG. 9, vehicle operator monitoring screen 900 may be displayed on the display 202 of the mobile device 110 executed in connection with blocks 306-316. The vehicle operator monitoring screen 900 may include a "Stop" button 902. If the "Stop" button 902 is selected by the user, the vehicle operator emotion management system 100 may terminate vehicle operator monitoring. Selecting the "Stop" button 902 may also permit the user to save additional information about the trip as well as launch a save trip screen 1100 as shown in FIG. 11.

Figure 10:
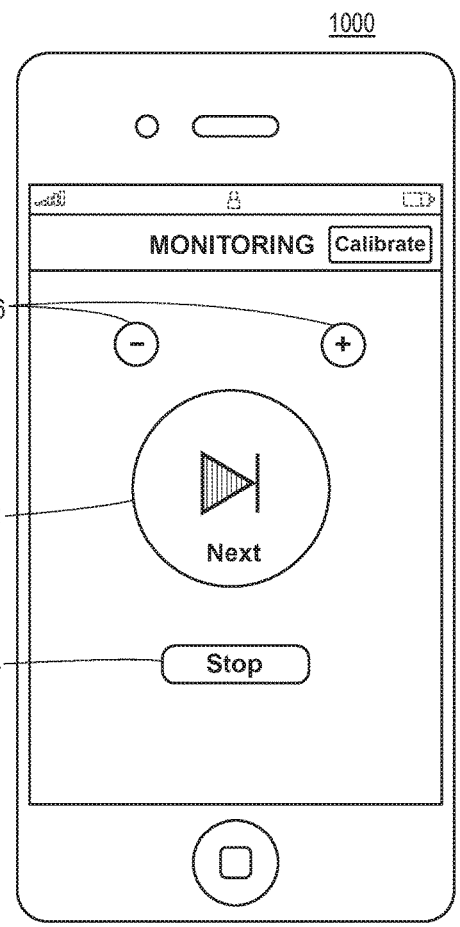

With reference now to FIG. 10, an alternative vehicle operator monitoring screen 1000 of the client application 232 may be displayed on the display 202 of the mobile device 110 in connection with blocks 306-316. The alternative vehicle operator monitoring screen 1000 may alternatively be displayed only while the system 100 presents stimuli in response to a vehicle operator emotional impairment in connection with block 314. The alternative vehicle operator monitoring screen 1000 may include a "Next" button 1002, a "Stop" button 1004, and rating buttons 1006. If the "Next" button 1002 is selected by the user, the emotional stimuli selection method 600 may update the user profile at block 620, select an alternative stimulus at block 614, and present the alternative stimulus to the vehicle operator 106 at block 612. If the "Stop" button 1004 is selected by the user, the emotional stimuli selection method 600 may update the user profile at block 626 and terminate vehicle operator emotion monitoring (blocks 306-316).

Figure 11:
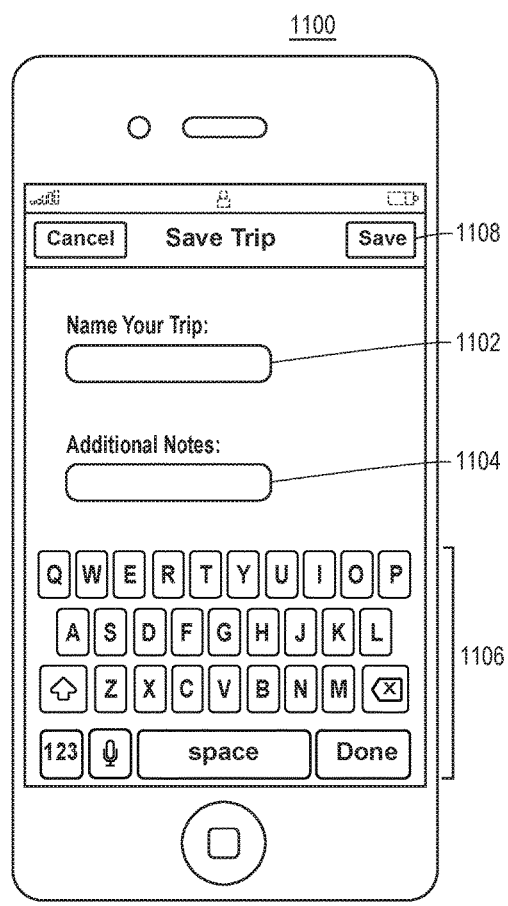

With reference now to FIG. 11, a save trip screen 1100 of the client application 232 may be displayed on the display 202 of the mobile device 110 used in connection with block 318. The save trip screen 1100 may include a trip name entry field 1102, an additional notes entry field 1104, an on-screen keyboard 1106, and a "Save" button 1108. A user may input a name of the trip into the trip name entry field 1102 or the additional notes entry field 1104 using the on-screen keyboard at 1106, a physical keyboard (not shown), or voice input. Selecting the "Save" button 1108 may cause the data from the trip (e.g., sensor data, individual impairment indicators scores, total impairment scores, user profile data, etc.) to be saved in data storage 228 or to be transmitted to the server 140 for remote storage in the system database 146.

Figure 12:
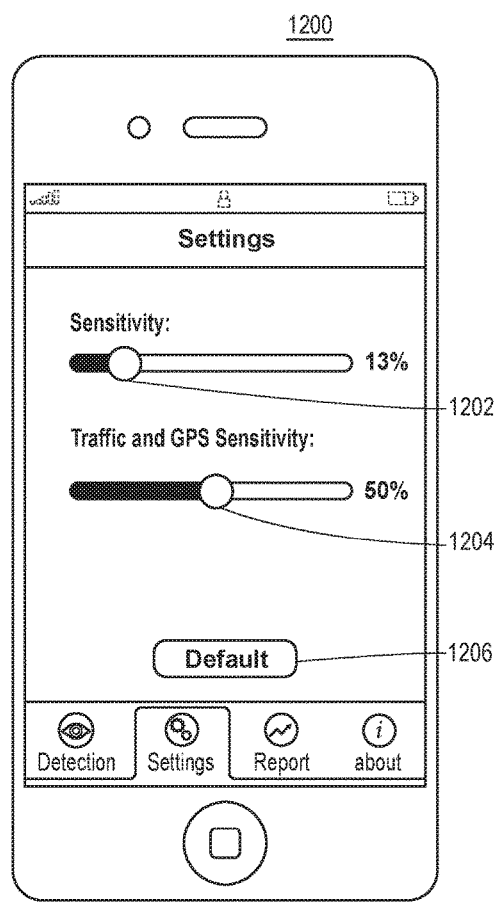

Referring again to FIG. 7 when the user selects the settings tab 706, a settings screen 1200 may be displayed on the display 202 of the mobile device 110 as shown in FIG. 12. The settings screen 1200 may include a sensitivity adjustment control 1202, a traffic and GPS sensitivity adjustment control 1204, and a "Default" button 1206. Adjusting the sensitivity adjustment control 1202 (e.g., by sliding a virtual slider) may increase or decrease the sensitivity setting of the vehicle operator emotion management system 100 as discussed above. Similarly, adjusting the traffic and GPS sensitivity adjustment control 1204 may increase or decrease the weight given to data regarding traffic conditions and vehicle location as accessed via network 130, relative to the weight given to data from the sensors. The "Default" button 1206 may be used to set the sensitivity adjustment control 1202 and traffic and GPS sensitivity adjustment control 1204 back to their default settings.

Figure 13:
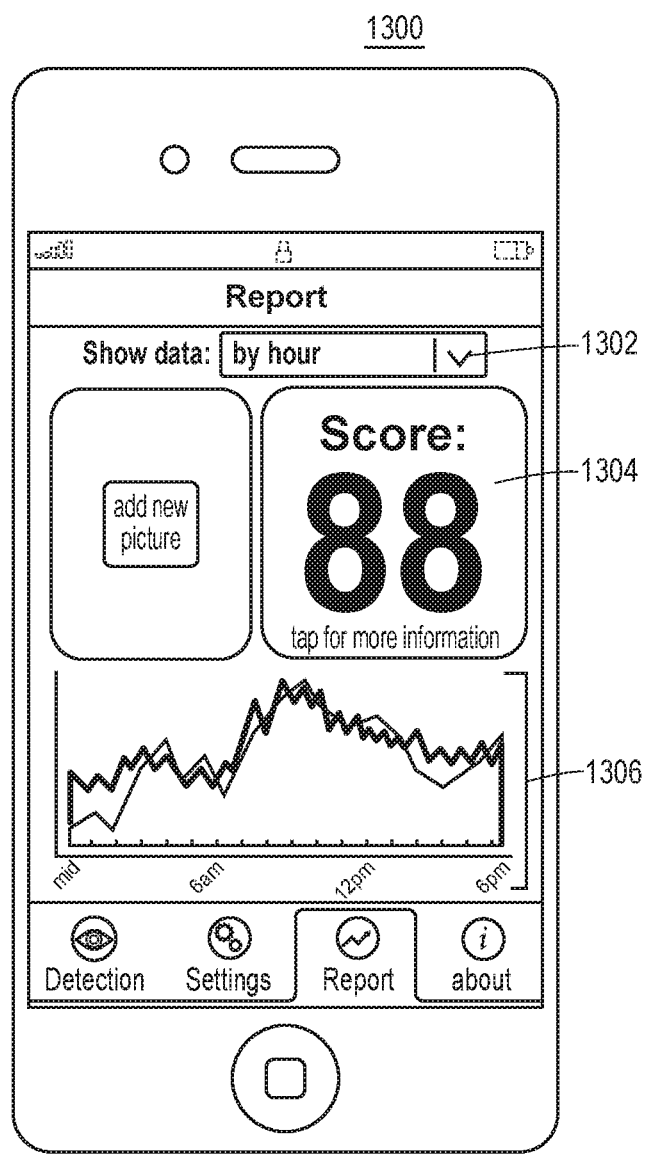

Referring again to FIG. 7, when the user selects the report tab 708, a report screen 1300 may be displayed on the display 202 of the mobile device 110 as shown in FIG. 13 used in connection with block 318. The report screen 1300 may include a data range adjustment control 1302, an average total impairment score 1304, and a graph of time versus one or more total impairment scores 1306. The data range adjustment control 1302 may be used to change the time axis (i.e., the X-axis) of the graph of time versus total impairment scores 1306 (e.g., show data by hour, by day, by month, by year, etc.). The average total impairment score 1304 may display the average of one or more total impairment scores of the most recently completed trip or an average of all of the trips for which the vehicle operator impairment monitoring system 100 has data.

Figure 14:
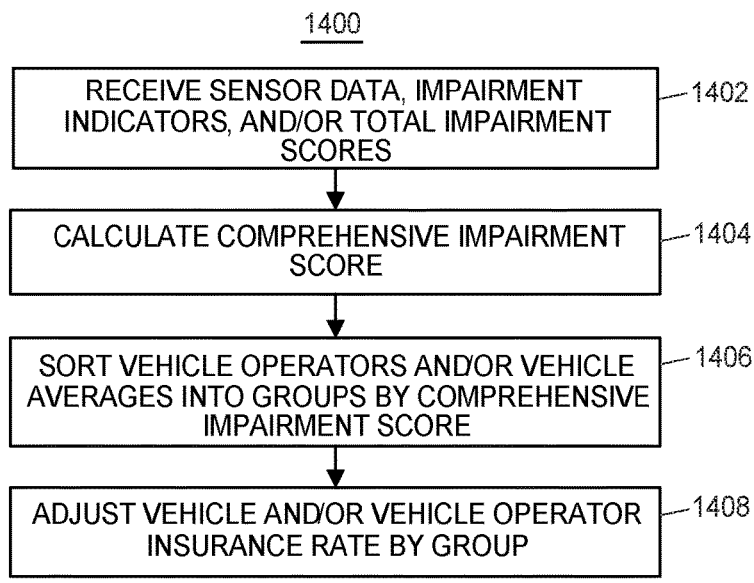
FIG. 14 depicts an insurance rate adjustment method for implementing the vehicle operator emotion management system in accordance with the presently described embodiments.

FIG. 14 is a flow diagram depicting an exemplary embodiment of an insurance rate adjustment method 1400 implemented by the vehicle operator emotion management system 100. More particularly the method 1400 may be performed by the server 140. The server 140 may receive some or all of the sensor data collected or generated by the mobile device 110, onboard computer 114, or physiological sensor 120 over the network 130 (block 1502). The sensor data may include physiological sensor data regarding the emotional state of the vehicle operator 106, as well as other sensor data regarding vehicle operation patterns and behavior (e.g., accelerometer data, proximity sensor data, GPS data, etc.) that may bear upon the risk of injury or property damage. The server 140 may also receive some or all of the individual impairment indicators and total impairment scores discussed above with respect to FIGS. 4 and 5. The server 140 may then determine one or more impairment scores based on the data received to block 1402 (block 1404). For example, the server 140 may determine a comprehensive impairment score representing a summary of the level of impairment of the vehicle operator 106 over a period of time, such as a month or a year. Alternatively, the comprehensive impairment score may represent a summary of the risk of injury and damage associated with the observed impairment levels and behavior of the vehicle operator 106 or the expected loss from such risk level.

Once a comprehensive impairment score has been calculated as discussed below, the comprehensive impairment score may be used to sort the insurance policy of the vehicle operator 106 into a comprehensive impairment level group with the policies of other vehicle operators with similar comprehensive impairment scores. The comprehensive impairment level groups may be set to follow a normal distribution; however, the comprehensive impairment level groups may also be set to follow any other known distribution model. There may be any number of comprehensive impairment level groups (e.g., ten comprehensive impairment level groups), and the groups may or may not be evenly distributed along the normal curve. Each of the groups may be assigned an insurance policy rate increase or decrease amount. For example, if there are ten comprehensive impairment level groups where Comprehensive Impairment Level Group 1 includes policies of vehicle operators associated that have the highest comprehensive impairment scores (indicating a high level of impairment) and Comprehensive Impairment Group 10 includes policies that have the lowest comprehensive impairment scores, then policies grouped in Comprehensive Impairment Level Groups 1-3 may be associated with an insurance rate increase (e.g., $300, $200, and $100, respectively), Comprehensive Impairment Level Groups 4-6 may not be associated with an increase or decrease, and Comprehensive Impairment Level Groups 7-10 may be associated with an insurance rate decrease (e.g., −$100, −$200, and −$300, respectively). This information on insurance rate adjustments based upon calculated risk related to vehicle operator emotional state may be conveyed to customers or prospective customers, providing an incentive for emotional state management and a disincentive for risky vehicle operation behavior.

Further, it may be advantageous to flag policies with particularly high levels of comprehensive impairment for cancellation of the insurance policy. In some embodiments, the policies grouped in the most impaired groups may not be charged an increased rate. In such embodiments, the prospect of a discount without the risk of an insurance rate increase may be used to entice a vehicle operator 106 to use the vehicle operator impairment monitoring system 100. Once the insurance policy of the vehicle operator 106 has been sorted into the appropriate group, the discount or increase that may be associated with the group may be applied to the policy of the vehicle operator 106 (block 1408). More than one vehicle operator 106 may be on the same policy (e.g., a married couple, a family with children on the policy, etc.). If more than one vehicle operator 106 is on the same policy, the vehicle operator emotion management system 100 may be used to adjust the rate for the entire policy based on the comprehensive impairment scores of the various vehicle operators 106, such as by aggregating or averaging the comprehensive impairment scores of the multiple vehicle operators.

Alternatively, or additionally, the comprehensive impairment score may be used to determine an amount of an insurance rate increase or decrease for a policy associated with the vehicle operator 106. The comprehensive impairment score may be used alone or in combination with other available information regarding the vehicle operator to estimate a risk level associated with the vehicle operator 106. The risk level determination may be used to adjust rates according to any mathematical, statistical, or actuarial model or may be used to limit insurance policy coverage under certain conditions. For example, certain minimal levels of insurance coverage may be required based on the risk determination, or, conversely, certain limitations may be set on the maximum level of insurance coverage available for losses due to certain causes. Insurance rates may also be quoted to a customer or prospective customer in a manner dependent upon future measurements of vehicle operator impairment. This may be particularly valuable for short-term policies, such as those associated with short-term vehicle rentals, or in other circumstances where a record of past impairment may be unavailable.

Figure 15:
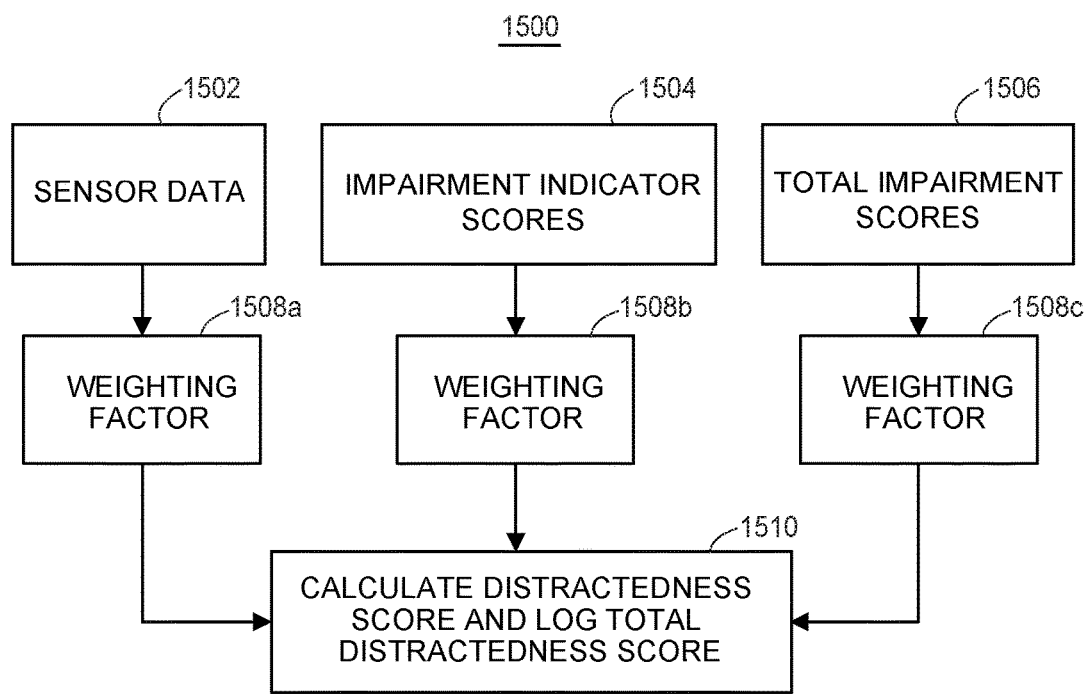
FIG. 15 depicts an exemplary comprehensive impairment score determination method for implementing the vehicle operator emotion management system in accordance with the presently described embodiments.

FIG. 15 is a flow diagram depicting an exemplary embodiment of a comprehensive impairment score determination method 1500 implemented by the vehicle operator emotion management system 100 while determining a comprehensive impairment score for the vehicle operator 106 at block 1404. The method 1500 may receive sensor data from the mobile device 110 or onboard computer 114 (block 1502), individual impairment indicators from the mobile device 110 or onboard computer 114 (block 1504), or total impairment scores calculated by the mobile device 110 or onboard computer 114 (block 1506). The method 1500 may also receive additional sensor data or telematic information regarding the operation of the vehicle 108. If the method 1500 receives sensor data, the server 140 may generate each impairment indicator score and total impairment score in a manner similar to how the mobile device 110 or onboard computer 114 calculates the scores as discussed above with respect to FIGS. 4 and 5. For example, the server 140 may determine a GSR score using GSR sensor data transmitted via network 130. Because the memory and computing power of the server 140 may be greater than the mobile device or onboard computer 114, it may be advantageous to calculate the various scores using a longer period of time (e.g., an average hard braking score over one week rather than over a number of minutes). Sensor data may also be directly used by the comprehensive impairment score determination method, in which case it may be normalized to an appropriate scale (e.g., 0-100 points, etc.) by any of the various known adjustment methods. The server 140 may also receive individual impairment indicator scores or total impairment scores from the mobile device 110 or onboard computer 114. In a manner similar to FIGS. 4 and 5, the method 1500 may determine a comprehensive impairment score by multiplying each score by a weighting factor 1508a, b, and c. Each score may be weighted equally, or it may be advantageous to weight the scores differently. The method 1500 may then sum the weighted scores to determine a comprehensive impairment score (block 1510). The comprehensive impairment score may be logged with a timestamp and stored in the system database 246.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method for managing an emotional state of a vehicle operator, comprising: receiving, using one or more processors, sensor data regarding the emotional state of the vehicle operator from one or more sensors; determining, using one or more processors, whether the received sensor data indicate the vehicle operator is in an impaired emotional state; selecting, using one or more processors, one or more stimuli to improve the emotional state of the vehicle operator based on the received sensor data by predicting the ability of the stimuli to improve the emotional state of the vehicle operator; and presenting the selected stimuli to the vehicle operator when the vehicle operator is determined to be in an impaired emotional state.

2. The method according to aspect 1, wherein the received sensor data comprises one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

3. The method according to either aspect 1 or aspect 2, wherein selecting the one or more stimuli further comprises selecting one or more of a musical composition, an ambient or natural sound recording, a recorded message, a constant or variable tone, an aromatic stimulus, a tactile stimulus, a temperature stimulus, a visual stimulus, or an ambient environmental condition.

4. The method according to any one of the preceding aspects, further comprising selecting the one or more stimuli using a user profile for the vehicle operator containing information relating prior stimuli presented to the vehicle operator to prior sensor data received from the one or more sensors at the time the prior stimuli were presented.

5. The method according to any one of the preceding aspects, further comprising receiving the sensor data by one or more mobile devices or one or more on-board computers within the vehicle, and determining with the mobile device or the on-board computer whether the sensor data indicate the vehicle operator is in an impaired emotional state, selecting with the mobile device or the on-board computer one or more stimuli, and controlling with the mobile device or the on-board computer the presentation of the stimuli to the vehicle operator.

6. The method according to any one of the preceding aspects, wherein determining, using one or more processors, whether the sensor data indicate the vehicle operator is in an impaired emotional state further comprises: calculating, using one or more processors, a plurality of impairment scores using the sensor data; calculating, using one or more processors, one or more total impairment scores from one or more of the plurality of impairment scores; and determining, using one or more processors, whether one or more of the total impairment scores fails to reach a minimum threshold value or exceeds a maximum threshold value.

7. The method according to any one of the preceding aspects, further comprising transmitting the sensor data, the impairment scores, or the total impairment scores to one or more servers through a network and determining with the one or more servers whether the sensor data indicate the vehicle operator is in an impaired emotional state, selecting one or more stimuli, and controlling the presentation of the stimuli to the vehicle operator.

8. The method according to any one of the preceding aspects, further comprising comparing the total impairment scores with total impairment scores of other vehicle operators to adjust an insurance premium charged to the vehicle operator.

9. A computer system for managing an emotional state of a vehicle operator, comprising: one or more processors; one or more sensors; and a program memory storing executable instructions that when executed by the one or more processors cause the computer system to: receive sensor data regarding the vehicle operator from the one or more sensors; determine whether the vehicle operator is in an impaired emotional state based on the received sensor data; select one or more stimuli to improve the emotional state of the vehicle operator based on the received sensor data; and deliver the selected stimuli to the vehicle operator when the vehicle operator is determined to be in an impaired emotional state.

10. The computer system according to aspect 9, wherein the sensors are configured to measure one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

11. The computer system according to either aspect 9 or aspect 10, wherein the stimuli are selected from a set of stimuli consisting of one or more of a musical composition, an ambient or natural sound recording, a recorded message, a constant or variable tone, an aromatic stimulus, a tactile stimulus, a temperature stimulus, a visual stimulus, or an ambient environmental condition.

12. The computer system according to any one of aspects 9-11, further comprising executable instructions that when executed by the processor cause the computer system to: access a user profile for the vehicle operator containing information relating prior stimuli presented to the vehicle operator to prior sensor data received from the one or more sensors at the time the prior stimuli were presented; predict the response of the vehicle operator to a plurality of stimuli using the sensor data and the user profile; and select one or more stimuli based upon the predicted responses of the vehicle operator to the stimuli.

13. The computer system according to any one of aspects 9-12, further comprising executable instructions that when executed by the processor cause the computer system to: calculate a plurality of impairment scores using the sensor data; calculate one or more total impairment scores from one or more of the plurality of impairment scores; and determine whether one or more of the total impairment scores fails to reach a minimum threshold value or exceeds a maximum threshold value.

14. The computer system according to any one of aspects 9-13, wherein the one or more processors are configured within a mobile device or an on-board computer.

15. The computer system according to any one of aspects 9-14, wherein the computer system further comprises one or more servers connected through a network and wherein the servers are configured to receive the sensor data or information derived therefrom, determine whether the vehicle operator is in an impaired emotional state, and select the stimuli to improve the emotional state of the vehicle operator.

16. A tangible, non-transitory computer-readable medium storing instructions that when executed by one or more processors of a computer system cause the computer system to: monitor a vehicle operator using sensor data from one or more sensors; determine whether the vehicle operator is in an impaired emotional state based on the sensor data; select one or more stimuli to improve the emotional state of the vehicle operator based on the sensor data; and cause the selected stimuli to be delivered to the vehicle operator when the vehicle operator is determined to be in an impaired emotional state.

17. The tangible, non-transitory computer-readable medium according to aspect 16, wherein the sensor data comprise one or more of the following types of physiological sensor data regarding the vehicle operator: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

18. The tangible, non-transitory computer-readable medium according to either aspect 16 or aspect 17, wherein the stimuli are selected from a set of stimuli comprising one or more of a musical composition, an ambient or natural sound recording, a recorded message, a constant or variable tone, an aromatic stimulus, a tactile stimulus, a temperature stimulus, a visual stimulus, or an ambient environmental condition.

19. The tangible, non-transitory computer-readable medium according to any one of aspects 16-18, wherein the executable instructions that when executed by the one or more processors cause the computer system to select the one or more stimuli to improve the emotional state of the vehicle operator based on the sensor data further comprise executable instructions that when executed by the one or more processors cause the computer system to: access a user profile for the vehicle operator containing information relating prior stimuli presented to the vehicle operator to prior sensor data received from the one or more sensors at the time the prior stimuli were presented; predict the response of the vehicle operator to a plurality of stimuli using the sensor data and the user profile; and select one or more stimuli based upon the predicted responses of the vehicle operator to the stimuli.

20. The tangible, non-transitory computer-readable medium according to any one of aspects 16-19, wherein the executable instructions that when executed by the one or more processors cause the computer system to determine whether the vehicle operator is in an impaired emotional state based on the sensor data further comprise executable instructions that when executed by the one or more processors cause the computer system to: calculate a plurality of impairment scores using the sensor data; calculate one or more total impairment scores from one or more of the plurality of impairment scores; and determine whether one or more of the total impairment scores fails to reach a minimum threshold value or exceeds a maximum threshold value.

21. The tangible, non-transitory computer-readable medium according to any one of aspects 16-20, further comprising executable instruction that when executed by the one or more processors cause the computer system to: transmit the sensor data, impairment scores, or total impairment scores to a server through a network; determine whether the vehicle operator is in an impaired emotional state and select one or more stimuli using the server; transmit the selected stimuli or data identifying the selected stimuli through the network from the server to the one or more mobile devices or the one or more on-board computers in the vehicle; and present the selected stimuli to the vehicle operator using the mobile device or the on-board computer.

What is claimed is:

1. A computer-implemented method for managing an emotional state of a vehicle operator of a vehicle, comprising:
    collecting, by one or more physiological sensors within the vehicle, sensor data regarding one or more physiological states of the vehicle operator, wherein the sensor data is physiological data regarding the vehicle operator;
    calculating, by one or more processors, a plurality of impairment indicator scores using the sensor data, wherein each impairment indicator score indicates an extent of vehicle operator deviation from a normal emotional state with respect to a physiological metric;
    calculating, by one or more processors, one or more total impairment scores as a weighted combination of two or more of the plurality of impairment indicator scores, each total impairment score indicating whether the vehicle operator is in an impaired emotional state;
    determining, by one or more processors, the vehicle operator is in an impaired emotional state based on the one or more total impairment scores;
    selecting, by one or more processors, one or more musical stimuli to improve the emotional state of the vehicle operator by predicting the ability of the stimuli to improve the emotional state of the vehicle operator based on the received sensor data and a user profile associated with the vehicle operator;
    determining, by one or more processors, that a sound component of the vehicle is currently in use;
    detecting, by one or more processors, a time at which the sound component is available to play the one or more musical stimuli; and
    when the sound component is detected to be available, causing, by controlling the sound component within the vehicle and while the vehicle operator is in the impaired emotional state, the one or more musical stimuli to be played to the user to improve the emotional state of the vehicle operator.

2. The computer-implemented method of claim 1, wherein the one or more musical stimuli include one or more recorded songs.

3. The computer-implemented method of claim 1, wherein detecting the time at which the sound component is available to play the one or more musical stimuli includes detecting the end of a currently playing song.

4. The computer-implemented method of claim 1, further comprising:
    receiving, at one or more processors, an indication from the vehicle operator to change the musical stimuli;
    updating, by one or more processors, the user profile based upon the received indication;
    selecting, by one or more processors, one or more alternate musical stimuli based upon the updated user profile; and
    causing, by controlling the sound component within the vehicle, the one or more alternate musical stimuli to be played to the user to improve the emotional state of the vehicle operator.

5. The computer-implemented method of claim 1, further comprising:
    receiving, at one or more processors, an indication from the vehicle operator to stop playing musical stimuli;
    updating, by one or more processors, the user profile based upon the received indication; and
    stopping, by controlling the sound component within the vehicle, the one or more musical stimuli from continuing to be played to the user.

6. The computer-implemented method of claim 1, further comprising:
    collecting, by one or more vehicle motion sensors within the vehicle, vehicle sensor data regarding movement of the vehicle during operation; and
    calculating, by one or more processors, a plurality of operational impairment indicator scores using the vehicle sensor data, wherein each impairment indicator score indicates a metric associated with proper vehicle operation by the vehicle operator, wherein at least one of the one or more total impairment scores is calculated as a weighted average of two or more of the impairment indicator scores and one or more of the operational impairment indicator scores.

7. The computer-implemented method of claim 1, wherein the received sensor data comprises one or more of the following types of physiological sensor data regarding the vehicle operator: a heart rate, heart rate variability data, a grip pressure, electrodermal activity data, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

8. The computer-implemented method of claim 1, wherein the user profile for the vehicle operator contains information relating prior stimuli presented to the vehicle operator to prior sensor data received from the one or more physiological sensors at the time the prior stimuli were presented over a period of at least one week.

9. The computer-implemented method of claim 1, wherein determining, by one or more processors, the vehicle operator is in an impaired emotional state further comprises:
 determining, by one or more processors, that one or more of the total impairment scores fails to reach a minimum threshold value associated with unimpaired vehicle operation or exceeds a maximum threshold value associated with unimpaired vehicle operation.

10. A computer system for managing an emotional state of a vehicle operator of a vehicle, comprising:
 one or more processors;
 one or more physiological sensors within the vehicle; and
 a program memory storing executable instructions that, when executed by the one or more processors, cause the computer system to:
  collect sensor data regarding one or more physiological states of the vehicle operator using the one or more physiological sensors, wherein the sensor data is physiological data regarding the vehicle operator;
  calculate a plurality of impairment indicator scores using the sensor data, wherein each impairment indicator score indicates an extent of vehicle operator deviation from a normal emotional state with respect to a physiological metric;
  calculate one or more total impairment scores as a weighted combination of two or more of the plurality of impairment indicator scores, each total impairment score indicating whether the vehicle operator is in an impaired emotional state;
  determine the vehicle operator is in an impaired emotional state based on the one or more total impairment scores;
  select one or more musical stimuli to improve the emotional state of the vehicle operator by predicting the ability of the stimuli to improve the emotional state of the vehicle operator based on the received sensor data and a user profile associated with the vehicle operator;
  determine that a sound component of the vehicle is currently in use;
  detect a time at which the sound component is available to play the one or more musical stimuli; and
  when the sound component is detected to be available and while the vehicle operator is in the impaired emotional state, cause the sound component within the vehicle to play the one or more musical stimuli to the user to improve the emotional state of the vehicle operator.

11. The computer system of claim 10, wherein the one or more musical stimuli include one or more recorded songs.

12. The computer system of claim 10, wherein the executable instructions that cause the computer system to detect the time at which the sound component is available to play the one or more musical stimuli further cause the computer system to detect the end of a currently playing song.

13. The computer system of claim 10, wherein the executable instructions further cause the computer system to:
 receive an indication from the vehicle operator to change the musical stimuli;
 update the user profile based upon the received indication;
 select one or more alternate musical stimuli based upon the updated user profile; and
 cause the sound component within the vehicle to play the one or more alternate musical stimuli to the user to improve the emotional state of the vehicle operator.

14. The computer system of claim 10, wherein the executable instructions further cause the computer system to:
 receive an indication from the vehicle operator to stop playing musical stimuli;
 update the user profile based upon the received indication; and
 stop the sound component within the vehicle from continuing to play the one or more musical stimuli.

15. The computer system of claim 10, further comprising one or more vehicle motion sensors within the vehicle, wherein:
 the executable instructions further cause the computer system to:
  collect vehicle sensor data regarding movement of the vehicle during operation from the one or more vehicle motion sensors within the vehicle; and
  calculate a plurality of operational impairment indicator scores using the vehicle sensor data, wherein each impairment indicator score indicates a metric associated with proper vehicle operation by the vehicle operator; and
 at least one of the one or more total impairment scores is calculated as a weighted average of two or more of the impairment indicator scores and one or more of the operational impairment indicator scores.

16. A tangible, non-transitory computer-readable medium storing instructions that when executed by one or more processors of a computer system cause the computer system to:
 monitor a vehicle operator of a vehicle using sensor data from one or more physiological sensors within the vehicle, wherein the sensor data is physiological data regarding the vehicle operator;
 calculate a plurality of impairment indicator scores using the sensor data, wherein each impairment indicator score indicates an extent of vehicle operator deviation from a normal emotional state with respect to a physiological metric;
 calculate one or more total impairment scores as a weighted combination of two or more of the plurality of impairment indicator scores, each total impairment score indicating whether the vehicle operator is in an impaired emotional state;
 determine the vehicle operator is in an impaired emotional state based on the one or more total impairment scores;

select one or more musical stimuli to improve the emotional state of the vehicle operator by predicting the ability of the stimuli to improve the emotional state of the vehicle operator based on the received sensor data and a user profile associated with the vehicle operator;

determine that a sound component of the vehicle is currently in use;

detect a time at which the sound component is available to play the one or more musical stimuli; and when the sound component is detected to be available and while the vehicle operator is in the impaired emotional state, cause the sound component within the vehicle to play the one or more musical stimuli to the user to improve the emotional state of the vehicle operator.

17. The tangible, non-transitory computer-readable medium of claim 16, wherein the one or more musical stimuli include one or more recorded songs.

18. The tangible, non-transitory computer-readable medium of claim 16, wherein the executable instructions that cause the computer system to detect the time at which the sound component is available to play the one or more musical stimuli further cause the computer system to detect the end of a currently playing song.

19. The tangible, non-transitory computer-readable medium of claim 16, further storing executable instructions further cause the computer system to:

receive an indication from the vehicle operator to change the musical stimuli;

update the user profile based upon the received indication;

select one or more alternate musical stimuli based upon the updated user profile; and cause the sound component within the vehicle to play the one or more alternate musical stimuli to the user to improve the emotional state of the vehicle operator.

20. The tangible, non-transitory computer-readable medium of claim 16, further storing executable instructions further cause the computer system to:

receive an indication from the vehicle operator to stop playing musical stimuli;

update the user profile based upon the received indication; and stop the sound component within the vehicle from continuing to play the one or more musical stimuli.

* * * * *